United States Patent [19]
Pierce

[11] Patent Number: 4,589,085
[45] Date of Patent: May 13, 1986

[54] HARDWARE MULTIPLIER PROCESSOR

[75] Inventor: Paul E. Pierce, Albuquerque, N. Mex.

[73] Assignee: The United States of America as represented by the United States Department of Energy, Washington, D.C.

[21] Appl. No.: 488,824

[22] Filed: Apr. 26, 1983

[51] Int. Cl.⁴ ............................................. G06F 7/52
[52] U.S. Cl. ................................... 364/754; 364/754
[58] Field of Search .............................. 364/754–760, 364/131, 200 MS File, 900 MS File, 133, 132, 704

[56] References Cited

U.S. PATENT DOCUMENTS

| | | |
|---|---|---|
| 3,617,723 | 11/1971 | Melvin . |
| 3,947,670 | 3/1976 | Irwin et al. . |
| 4,107,773 | 8/1978 | Gilbreath et al. ................ 364/704 |
| 4,135,249 | 1/1979 | Irwin ................................ 364/758 |
| 4,156,927 | 5/1979 | McElroy et al. ................. 364/900 |
| 4,202,039 | 5/1980 | Epenoy et al. ................... 364/757 |
| 4,262,336 | 4/1981 | Pritchard ......................... 364/132 |
| 4,287,566 | 9/1981 | Culler .............................. 364/754 |

OTHER PUBLICATIONS

Pierce, Paul, "Aerospace Applications of Microprocessors", NASA Conference Publication 2158, Nov. 3, 1980.
Getz, Kenneth, "When One μP Controls Another," Electronic Design, vol. 26, Jan. 18, 1978, pp. 72–76.
Lowenthal, Richard, "Floating Point Microprocessor Implemented as Optional Co-Processor", Computer Design, vol. 20, #3, Mar. 1981, pp. 178–182.

Primary Examiner—James D. Thomas
Assistant Examiner—Dale M. Shaw
Attorney, Agent, or Firm—George H. Libman; Albert Sopp; Judson R. Hightower

[57] ABSTRACT

A hardware processor is disclosed which in the described embodiment is a memory mapped multiplier processor that can operate in parallel with a 16 bit microcomputer. The multiplier processor decodes the address bus to receive specific instructions so that in one access it can write and automatically perform single or double precision multiplication involving a number written to it with or without addition or subtraction with a previously stored number. It can also, on a single read command automatically round and scale a previously stored number. The multiplier processor includes two concatenated 16 bit multiplier registers, two 16 bit concatenated 16 bit multipliers, and four 16 bit product registers connected to an internal 16 bit data bus. A high level address decoder determines when the multiplier processor is being addressed and first and second low level address decoders generate control signals. In addition, certain low order address lines are used to carry uncoded control signals. First and second control circuits coupled to the decoders generate further control signals and generate a plurality of clocking pulse trains in response to the decoded and address control signals.

17 Claims, 10 Drawing Figures

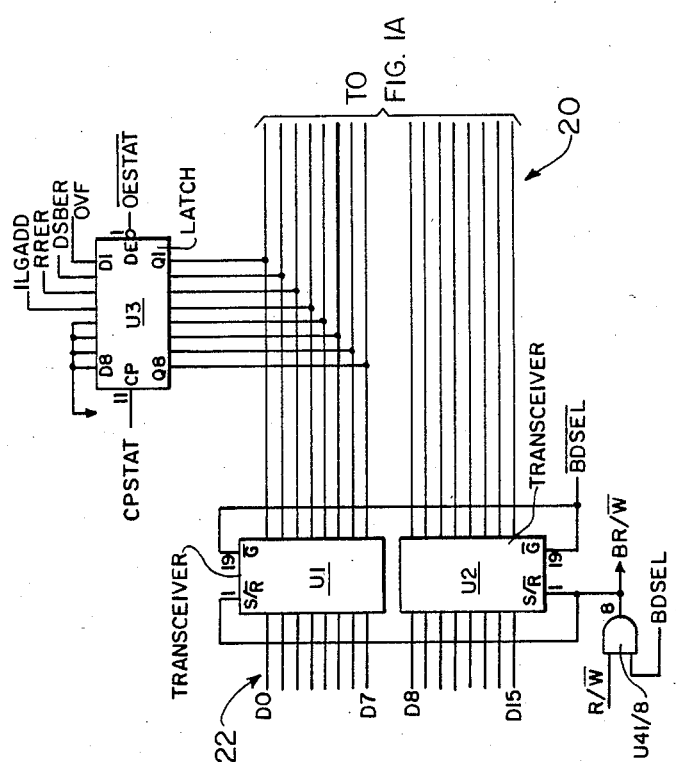
*FIG. IB*
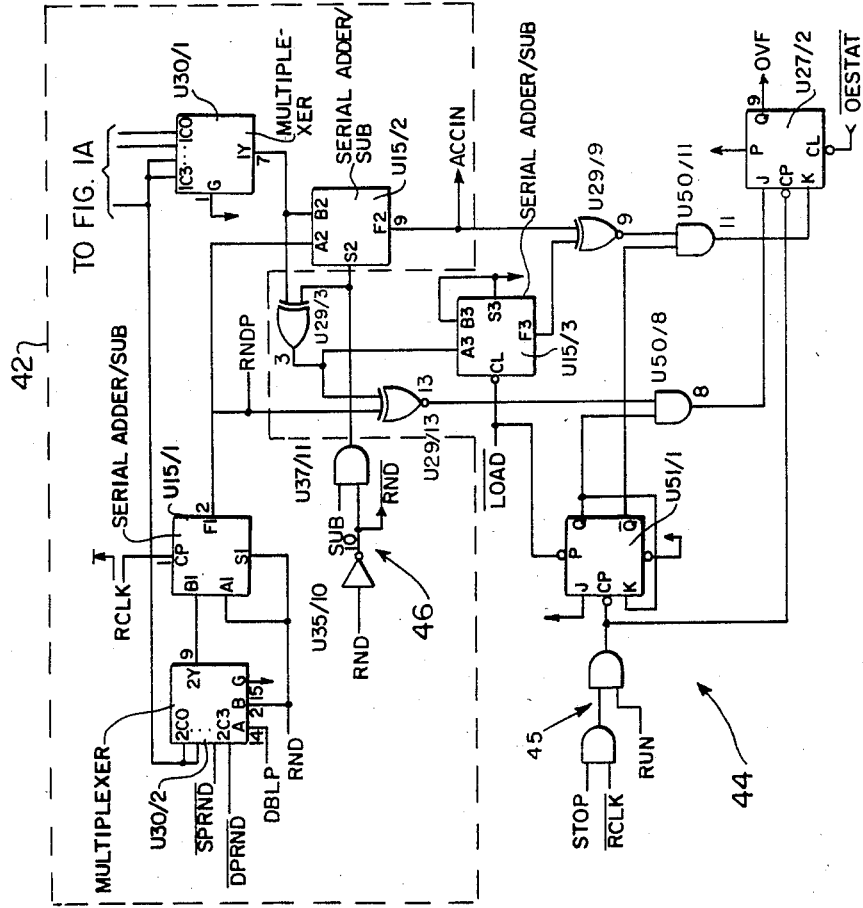
*FIG. IC*

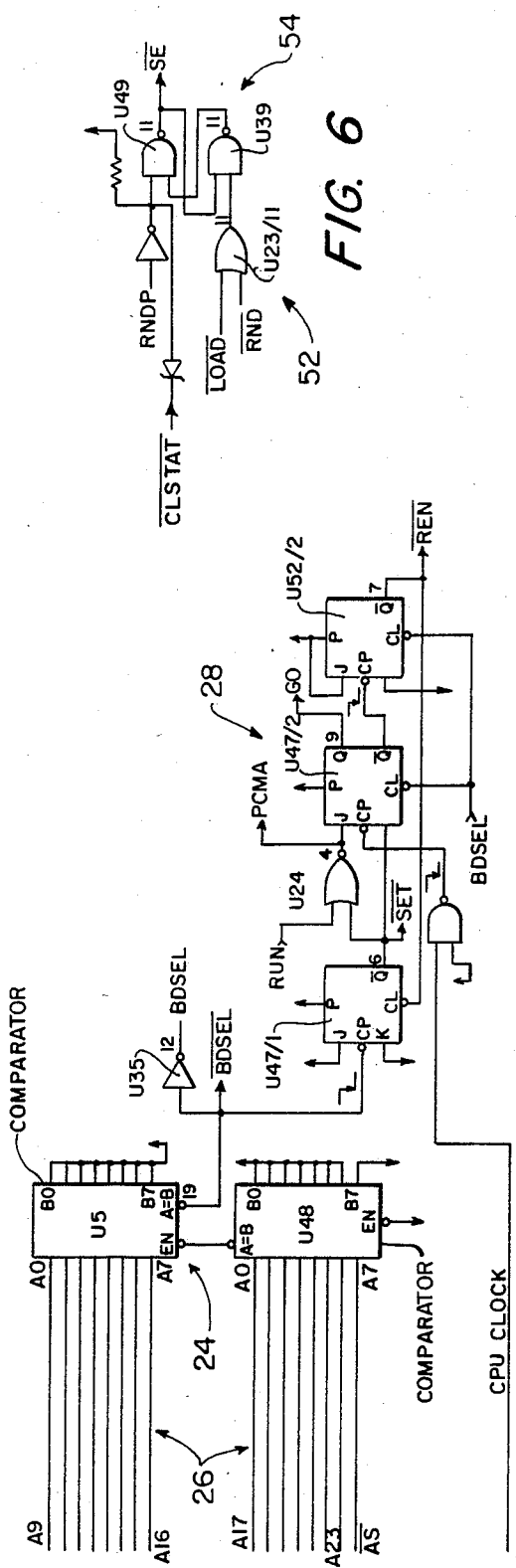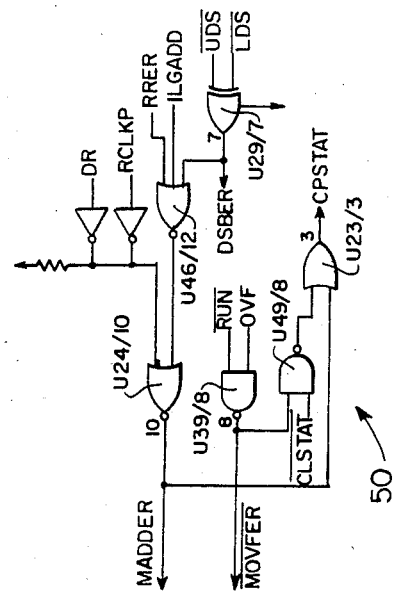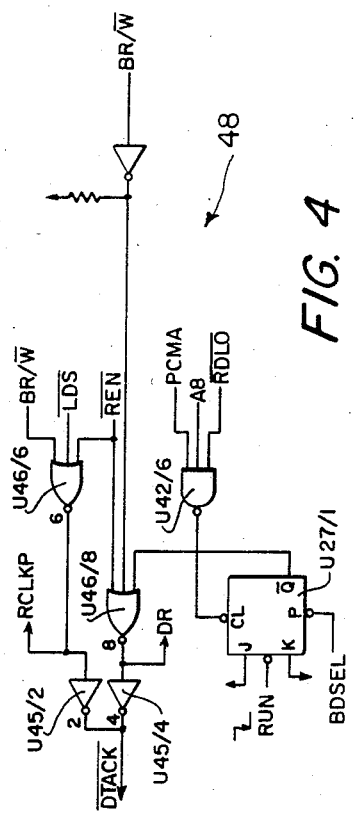

SINGLE PRECISION MULTIPLICATION TIMING WAVEFORMS

SINGLE PRECISION SCALE $2^0$, ROUND AND READ TIMING WAVEFORMS

HARDWARE MULTIPLIER PROCESSOR

The United States has rights in this invention pursuant to Contract No. DE-AC04-76DP00789 between the Department of Energy and Sandia Corporation.

FIELD OF THE INVENTION

The present invention relates to an electronic circuit that is connectable to a microprocessor or microcomputer. In particular, the present invention relates to an electronic circuit for enhancing a microprocessor's arithmetic capabilities by performing arithmetic operations in hardware at a very high speed.

BACKGROUND OF THE INVENTION

A severe limitation of present day microcomputer systems is the speed at which arithmetic computations are carried out. The relatively slow speed of microcomputers using software to carry out arithmetic computations frequently limits the use of microcomputer systems to either slow speed utilizations or limits the accuracy of the calculations.

Several applications exists for high speed computer systems which must perform arithmetical computations as well as data manipulations. One such application relates to navigation and autopilot functions of high performance weapons systems Navigation and autopilot algorithms must be performed at iteration rates approaching 1 KHz. Frequently, these algorithms require significant numbers of both 16 bit and 32 bit multiplications.

Conventional, state of the art microprocessors, such as the Z8000 microprocessor and the MC6800 microprocessor, perfrom 16 bit multiplications in 9 to 20 microseconds and 32 bit multiplications in 75 to 125 microseconds. However, data transfer times to memory locations are typically on the order of 1 to 2 microseconds. Most high performance airborn computer applications cannot be adequately serviced by computers with these relatively slow multiplication execution times.

The arithmetic operations which take the most time, and thus are in need of speed enhancement are the multiplication of signed two's complement numbers, the summation of products, and the scaling by a desired power "n" to the base 2, and rounding of results. While commercial integrated circuits are available which implement multiplication and sum of products (such as are used in conventional calculators), none of the commercially available integrated circuits can perform all of these functions or are directly compatible with microcomputer systems.

Some specific examples of prior art systems include an arithmetic processor labelled AM9511 sold by Advanced Micro Devices, Inc. This commercially available arithmetic processor is an integrated circuit level system that is treated as a peripheral by the host CPU. The arithmetic processor is loaded with several arguments and then given a command to execute some function by the CPU. A significant amount of overhead software as well as relatively long execution times are required by these systems. However, these systems can be successfully interfaced to many different CPU types and require relatively little interface circuitry. A second category of prior art circuits, typically on the integrated circuit level, are termed parallel processors. These devices are usually designed to be compatible with only one type of host CPU because the processor is connected in parallel with the CPU. The parallel processor executes instructions (i.e., op codes) fetched from the program memory. These instructions must be selected as being illegal or unimplemented instruction codes to the host CPU. An example of such a parallel processor is the 8087 which is designed to be compatible with the 8086 microprocessor. Both of these integrated circuits are manufactured by the Intel Corporation. Both the arithmetic processor and the parallel processor usually execute a family of floating point instructions and some processors can even perform transendental functions. However, most of these processors do not support fixed point rounding and scaling in an efficient manner.

In addition to a need for a very fast single and double precision multiplier, with or without subsequent addition or subtraction steps, is the need for very fast circuitry that will round off and scale the calculated answer. The conventional way is to load the answer into the processor and then use the processor to shift the data and keep track of the scale factor. This procedure requires complicated software and a dedicated processor. Furthermore, this conventional way is relatively slow.

A further disadvantage of a conventional system using a microprocessor interfaced with a peripheral math processor is the seriatim transfer of the numbers or parameters followed by the command instructions. Obviously, this approach is twice as slow as one which would combine the two functions into a single step.

In summary, the disadvantages of the prior art devices include relatively slow speed, lack of compatibility with different types of microprocessors, and complex interfacing requirements. Many of the prior art systems also fail to provide high accuracy at a high speed.

SUMMARY OF THE INVENTION

The present invention provides a hardware multiplier processor that overcomes these and other disadvantages of the prior art. The present invention provides real-time multiplication processing requirements having a very high accuracy at a relatively rapid rate. The present invention can operate with any conventional 16 bit or 32 bit CPU in a completely parallel mode so as not to interfere with the operations of the CPU. By incorporating a memory mapped processor, the present invention can perform 16 and 32 bit multiplications and can optionally add or subtract the calculated, full product to the previous contents of an accumulator. In addition, the result of the multiplication and accumulation operations can be selectively transferred in its entirety or scaled by $2^{+-30}$ and rounded automatically prior to its transfer back to the host CPU. In fact, the present invention is so fast that it can be used with conventional microprocessors running up to 8 MHz and still provide the calculations and scaling and rounding in times that approach a simple memory access by the microprocessor.

A novel feature of the specifically disclosed embodiment of the present invention is the use of specific addresses to perform preselected functions on previously or simultaneously stored data. A second novel feature of the presently preferred embodiment is the automatic initiation of the preselected multiplication, accumulation and subtraction options following the writing of the multiplicand argument to the appropriate address. A third novel feature of the present invention is the retrieval of a scaled and rounded answer by the host CPU by simply having the CPU read the answer at a preselected address. A fourth novel feature of the presently preferred embodiment is the passing of the exponent argument for the shift instruction through the address field.

By using conventional integrated circuits, the present invention is extemely simple to interface to any CPU system as a read/write memory module. The timing relationships between the host CPU and the present invention are asynchronous and full handshaking is incorporated for data transfers in each direction. Since all conventional CPUs have provisions to accommodate wait or ready handshake signals for accommodating memories with slower access times, both the host CPU and the present invention can run independently at their respective maximum clock rates. The present invention can implement most of its functions in times approaching those of simple memory accesses by the host CPU by utilizing conventional integrated circuit components. Further, complex operations are performed by the present invention as a result of the almost simultaneous passing of a data argument on the data bus and a command argument on the address bus during a single memory access by the host CPU. This reduces the host CPU execution time and program requirements.

The specifically disclosed embodiment of the present invention incorporates serial/parallel hardware multiplier integrated circuits, a translation PROM, an address controlled logic to implement the arithmetic functions. The use of serial arithmetic circuitry yields a processor of small physical size, relatively low power and significant flexibility. The computation time of the present invention is shorter than most of the general memory addressing modes of conventional host CPUs. Least significant CPU address bits (9 in the present embodiment) are used in conjunction with a translation PROM to control all of the functions of the present invention. The translation PROM provides a function related serial clock count to a clock control logic, which in turn controls the internal timing of the present invention.

With respect to specific applications of the present invention in the navigational field, a hardware multiplier processor can easily and rapidly accomplish single and double precision multiplication resulting in a 64 bit number and then retrieve and round the 64 bit number back to a 32 bit number so it can be multiplied again. Furthermore, the same hardware that is involved in conducting the multiplication function is also used for scaling and rounding the answers when they are being retrieved. By using the same hardware in different fashions to implement the different functions of multiplication and scaling and rounding, a simpler and more reliable system can be achieved.

In a presently preferred embodiment of a hardware multiplier processor according to the present invention, the processor is comprised of an electronic circuit for use in parallel with a computer having a data bus and an address bus. The electronic circuit performs high speed mathematical operations and includes a data I/O means connectable to the computer data bus and an address I/O means connectable to the computer address bus for respectively receiving and providing data to and from the computer and for receiving coded addresses. The electronic circuit further includes a first decoding means connected to the address I/O means for determining the particular operation to be performed and hardware multiplier circuits connected to the first decoding means and to the data I/O means for receiving and manipulating data on the data bus under the command of the first decoding means.

These and other functions, advantages, features and objects of the present invention will be set forth in or apparent from the accompanying drawings and the detailed description of the presently preferred embodiment found hereinbelow.

BRIEF DESCRIPTION OF THE DRAWINGS

FIG. 2 is an electronic schematic circuit diagram of part of the address input/output circuits and some of the address decoding circuits for generating signals used by other elements of the present invention.

FIG. 4 is an electronic schematic circuit diagram of a circuit for generating a handshaking signal used by a host computer.

FIG. 5 is an electronic schematic circuit diagram of a circuit used to generate certain error signals.

FIG. 6 is an electronic schematic circuit diagram for generating a signal used by the hardware multiplier circuits of FIG. 1.

DESCRIPTION OF THE PREFERRED EMBODIMENT

Figure 1A:
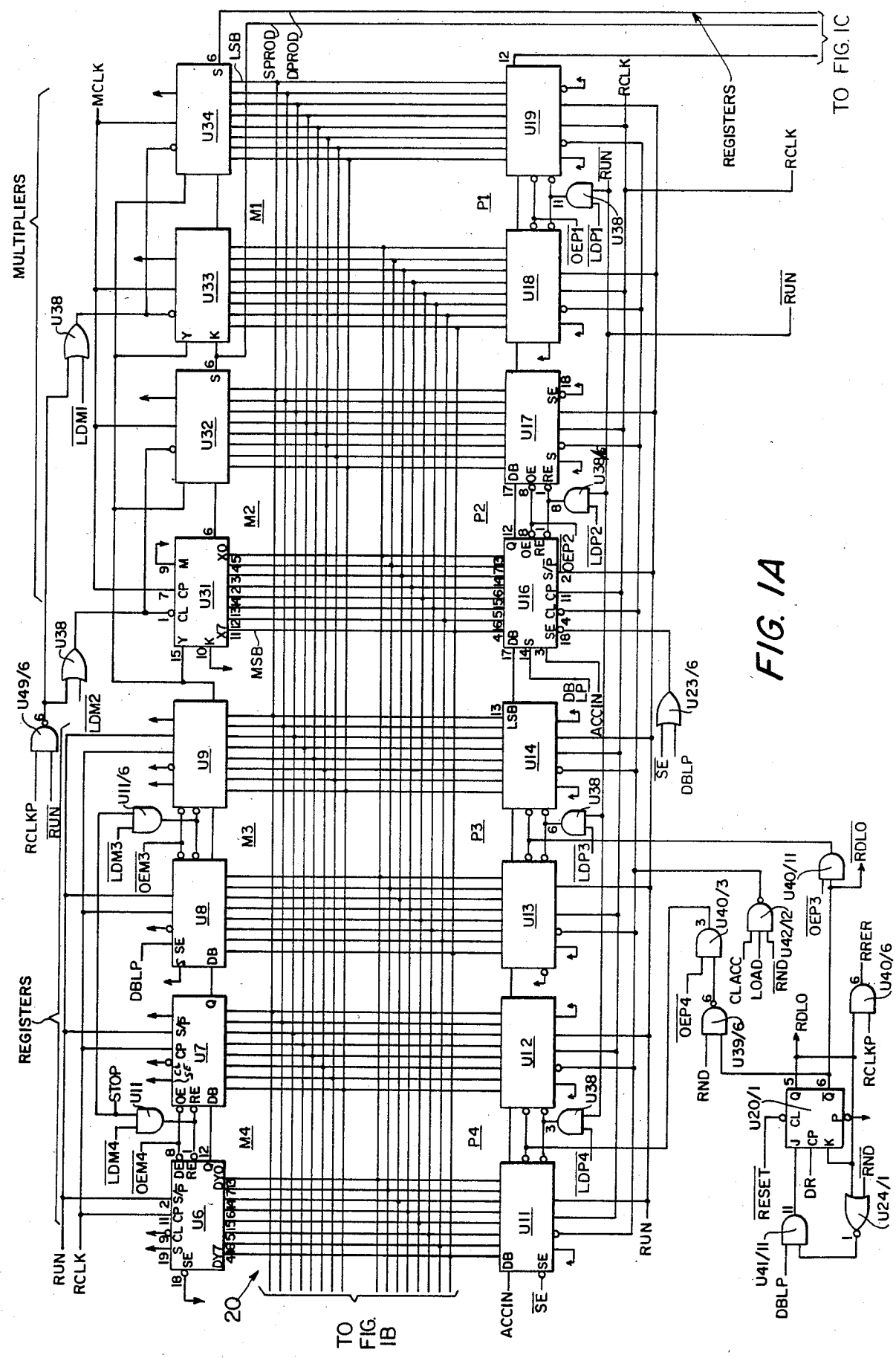
FIG. 1, comprising of FIGS. 1A–1C, is an electronic schematic circuit diagram of the data input/output circuits and the hardware multiplier circuits of a hardware multiplier processor in accordance with the present invention.

With reference now to the Figures wherein like designations represent like elements throughout the several views, a hardware multiplier processor is disclosed in a presently preferred embodiment. In the drawings, an arrow pointing upwards means that that particular connection is tied high (i.e. connected to plus five volts in the present embodiment) and an arrow pointing downwardly means that the particular point is tied low (i.e. connected to ground in the present embodiment). The particular multiplier processor depicted in the Figures is specifically designed to operate in parallel with appropriate hand shaking with an MC68000-based microcomputer. The 68000 microprocessor is commercially available from Motorola Corporation and is a 16 bit processor that has a 24 bit address bus. The multiplier processor according to the present invention is connected to the microcomputer and its buses as a memory mapped device.

The multiplier processor of the present invention is comprised of commercially available integrated circuit chips. These chips are identified in Table 2 by their device number and by their function. The various signals which are developed in the circuitry of the present invention are summarized and identified in Table 3 both by origin and by function. A star (*) following or line over a signal name indicates the inverse of the signal.

With particular reference to FIG. 1, which is divided into 3 parts, FIG. 1A, FIG. 1B, and FIG. 1C, the data input and output circuitry as well as the multiplier and round circuitry are depicted. The multiplier circuitry, discussed in greater detail below, is comprised of two multiplicand registers M1 and M2, two multiplier registers M3 and M4, and four product registers P1, P2, P3 and P4. The data input-output circuitry is comprised of two bi-directional buffers or transceivers U1 and U2. Transceivers U1 and U2 determine the direction of data flow to and from a 16 bit multiplier processor data bus 20 from and to a 16 bit microcomputer data bus 22. The direction of data flow is determined by gating the read/-write* signal generated by the computer with a BDSEL signal in an AND gate U41 and coupling the output to the direction control of transceivers U1 and U2. The inputs and the outputs of transceivers U1 and U2 are normally in the high impedance state except when the transceivers are enabled by a BDSEL* signal (BoarD SELect). The BDSEL* signal is generated when the host computer addresses the multiplier processor. This use of the BDSEL signal is one of the controls that permits the host computer and the multiplier processor to run in parallel.

The BDSEL* signal is generated in a first address decoding circuit 24 depicted in FIG. 2. Circuit 24 is comprised of two 8 bit equal to comparators U5 and U48 respectively connected on the "A" sides to address bits A9 to A16 and A17 to A23 of the host computer high order address bus denoted 26. Also connected to the "A" side of comparator U48 is the AS* signal (Address Strobe) one of the handshaking signals provided by the 68000 microcomputer. The "B" side of comparators U5 and U48 are hard wired to the desired memory mapped location. In the presently depicted embodiment this covers the hex addresses of FFFE00 to FFFFFE (for a 24 bit address bus). The "A=B" output of comparator U48, active when LOW, is coupled to enable input EN of U5, and the "A=B" output of comparator U5 generates the BDSEL* signal. An inverter U35/12 generates the inverted BDSEL signal.

Three interconnected, J-K flip-flops, U47/1, U47/2 and U52/2, comprise a first control signal generating circuit 28 which is triggered by the BDSEL* signal. The first flip-flop U47/1 is clocked on the negative edge of the BDSEL signal, thereby transferring the LOW from the grounded K input to the Q* output. The signal at this Q* output is denoted SET* and this signal will remain LOW until flip-flop U47/1 is cleared. The SET* signal feeds one half of a NOR gate 24/4 and also is connected to the clock input of the second flip-flop U47/2. The output of NOR gate 24/4 provides the PCMA signal which feeds the J input of second flip-flop U47/2, latches a latch U4(FIG. 3) when HIGH, and is used in a handshake signal generating circuit 48 depicted in FIG. 4. The other input to NOR gate 24/4 is a signal denoted RUN, which is used to block the remainder of circuit 28 from being effected by the host computer. This is done when RUN is a high level signal by tieing PCMA signal LOW, and thus preventing the transfer of signals through the second flip-flop U47/2 (ie., both the J and K inputs would be LOW and a clock pulse would not affect the outputs of the flip-flop). The generation of the RUN signal is discussed below with respect to FIG. 3. The clock input CP of second flip-flop U47/2 is permanently connected to the inverted CPU clock signal.

Figure 3:
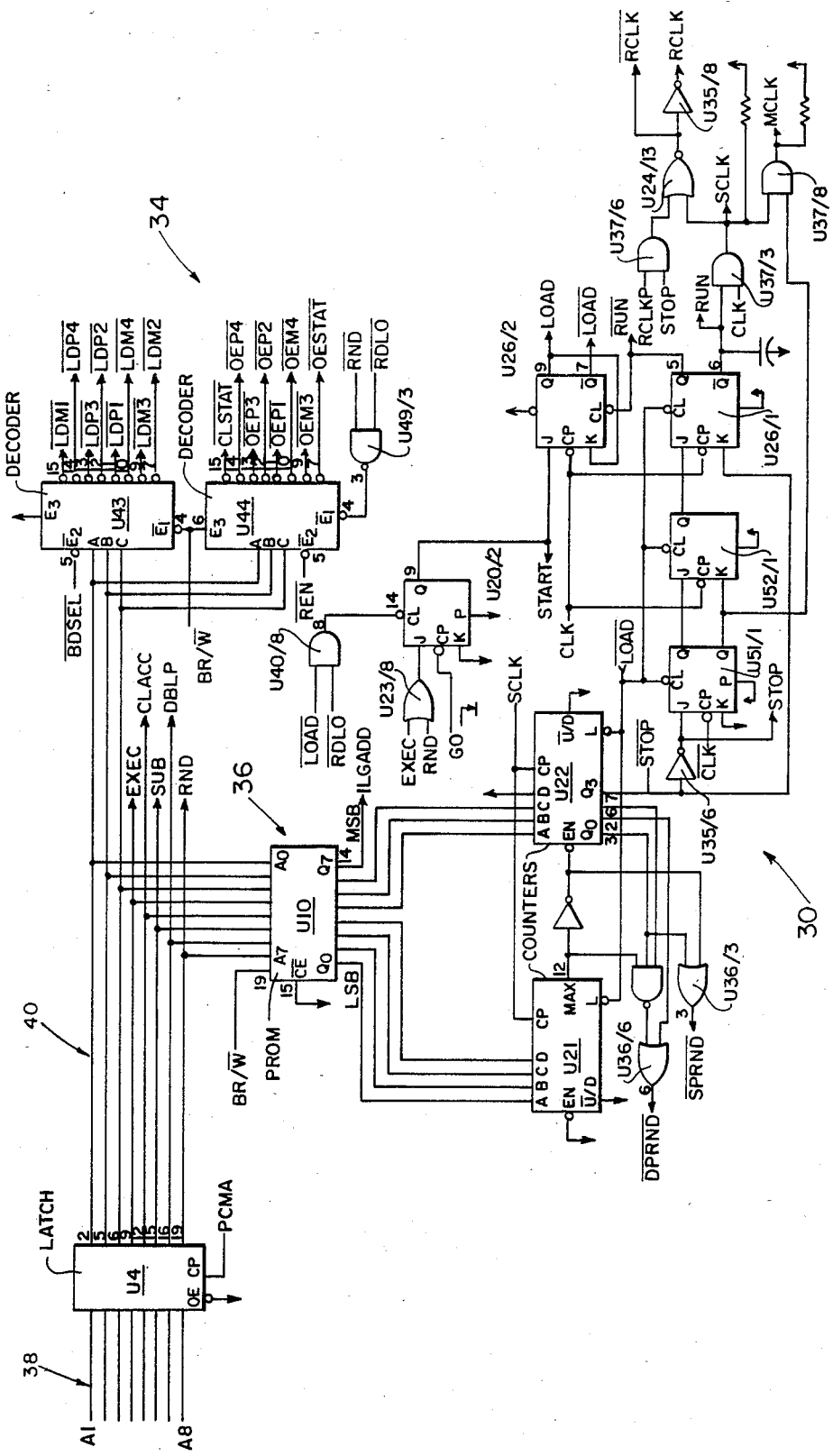
FIG. 3 is an electronic schematic circuit diagram of the remainder of the address input/output circuits and the second part of the address decoding circuits for generating signals used by the other components of the present invention and for generating certain clocking signals.

The Q output of second flip-flop 47/2 generates the "GO" signal, which is used by a second control signal generating circuit 30, described below with respect to FIG. 3. The Q* output of second flip-flop U47/2 is connected to the clock input of third flip-flip U52/2, which is clocked on the negative going edge of the applied signal. The J and K inputs of third flip-flop U52/2 are tied high and low, respectively, and thus these values will be transferred to the Q and Q* outputs, respectively, when it is clocked. However, only the Q* output is used, and this output generates the REN* signal [Register ENable]. The REN* signal is used to clear first flip-flop U47/1, and is also used in handshake signal generating circuit 48 (FIG. 4) and to enable part of a second address decoding circuit 34 (FIG. 3). Second and third flip-flops U47/2 and U52/2 are cleared when the BDSEL signal goes LOW (i.e. when multiplier processor is not being addressed by the host computer).

With reference now to FIG. 3, second address decoding means 34 and a third address decoding means 36 will now be described. The input of latch U4 is connected to a low order address bus 38 of the host computer. As described above, latch U4 is latched when PCMA signal goes high. Because PCMA signal is tied low while the hardware processor is in operation (RUN signal is high), second address decoding circuit 34 and third address decoding circuit 36 cannot be affected by the host computer during this time.

Second address decoding circuit 34 is comprised of two 3-to-8 line decoders U43 and U44. The three lowest order bits (A1, A2 and A3) of the latched low order address bus 38 are connected in parallel to the three select inputs of decoders U43 and U44. Decoder U43 is enabled when hardware processor has been addressed by the host computer (BDSEL* is LOW) and when a signal BR/W* (Board Read-Write) is LOW. Signal BR/W* is generated by the circuitry of FIG. 1B by combining a signal R/W* provided by the host computer and the BDSEL signal in an AND gate U41. The signal BDSEL is used to enable AND gate U41 whenever the Multiplier Processor is addressed. Thus, signal BR/W* is LOW when signal R/W* is LOW, and this occurs when the host computer is writing to the Multiplier Processor. When decoder U43 is enabled, the information on the three lowest order address lines is decoded to provide a LOW load signal to one of the four M registers (LDM1*, LDM2*, LDM3* or LDM4*), or to one of the four P registers (LDP1*, LDP2*, LDP3* or LDP4*) (See Table 1 and FIG. 1A).

Decoder U44 is enabled during a read operation by the host computer (i.e. signal BR/W* is HIGH), except for those read accesses associated with scale and round operations. When these occur the output from NAND gate U49/3 is HIGH. In addition, decoder U44 is only enabled when signal REN is low, and it is low after the Multiplier Processor has been addressed and before the system clock has been initiated (i.e., signal RUN is LOW). The output from NAND gate U49/3 is LOW when signals RND* and RDLO* are both HIGH. Signal RND* is the inverse of one of the bits of the low order address line (A8) and is HIGH when the host computer is not requesting that a product be rounded.

RDLO* is generated by the circuitry in FIG. 1A and is normally HIGH except during a round and double precision read operation, as discussed hereinbelow.

When decoder U44 is enabled, the information on the three lowest order address lines is decoded to provide a LOW output enable signal to one of the four P registers (OEP1*, OEP2*, OEP3* or OEP4*); a LOW output enable signal to the M3 or M4 register (OEM3* or OEM4*); a LOW signal (CLSTAT*) used to generate (FIG. 5) a latch pulse for status register U3 (FIG. 1B) or to disable (FIG. 6) the sign extend (signal SE*) function (see FIG. 1A); or a LOW signal (OESTAT*) to enable the status register U3 (FIG. 1B) and to clear the overflow signal (signal OVF generated by flip-flop U27/2, FIG. 1C).

Third address decoding circuit 36 is comprised of a PROM U10 addressed by a latched low order address bus 40 and the signal BR/W* as the MSB. Thus the same processor address can be used to order two different operations. For example, processor address FE02 is used at PROM address 001 to write to Register P4 (BR/W* is LOW) and at PROM address 101 to read from registers P4 (BR/W* is HIGH). The data stored in the selected address of PROM U10 (see Table 1) are coupled to second control signal generating circuit 30. In particular, the four low order bits are coupled to a first four bit up/down counter U21 and the next three high order bits are coupled to a second four bit up/down counter U22. The most significant bit provides a signal ILGADD (ILleGal ADDress). When ILGADD is HIGH, the circuitry of FIG. 5 generates an interrupt signal sent to the host computer and ILGADD is sent to status latch U3 (FIG. 1B). The four and three groups of low order data bits of PROM U10 are the two's compliment plus two of the number of clock pulses required to perform the particular operation. This is due to the way the outputs of counters U21 and U22 are used to generate the timing and control waveforms for the M and P registers.

Counters U21 and U22 are used to generate control pulses after a specific interval determined by the count loaded into them. The direction status inputs (U*/D) of counters U21 and U22 are tied low so that both counters count up when clocked. The enable input of counter U21 is tied low so that the counter is always enabled, and the enable input of counter U22 is connected through an inverter to the overflow or MAX output of counter U21. Counters U21 and U22 are both clocked, when enabled, by a pulse train SCLK that is gated by the RUN signal. Both counters U21 and U22 are loaded with the data at their respective inputs when a signal LOAD* is LOW, as described below. Thus, when clocked, counter U21 will first count in the upwards direction for a number of counts equal to 16 minus the number loaded into it and then second counter U22 will be enabled to count once in the upwards direction.

The output count of bits $Q_0$ through $Q_2$ of counter U22 are decoded by a three input NAND gate, a first OR gates U36/6, the output of which generates a delayed pulse signal DPRND* (Double Precision RouND), and a second OR gate U36/3, the output of which generates a delayed pulse signal SPRND* (Single Precision RouND). Signals DPRND* and SPRND*, are applied to two of the data inputs of a multiplexer U30/2 (FIG. 1C), as explained below. Each signal is normally HIGH except for one LOW pulse, one clock width long (e.g. see FIG. 8 for SPRND*).

The high order bit $Q_3$ of counter U22 generates a signal STOP* coupled to the K input of a flip-flop U26/1 and through an inverter U35/6 to produce a signal STOP. Signal STOP is used to terminate the system serial register clock (RCLK), discussed below (See FIGS. 7 and 8) and as a signal to the overflow circuitry (depicted in FIG. 1C).

Second control signal generating circuit 30 further includes three interconnected J-K flip-flops U51/1, U52/1 and U26/1 and two interconnected J-K flip-flops U20/2 and U26/2. These five flip-flops are used to generate most of the critical timing and clock signals of the Multiplier Processor. A standard Multiplier Processor clock (not shown) is comprised of conventional circuitry and in the depicted embodiment generates a 16 MHz pulse train denoted CLK or its inverted form CLK*. Either the pulse train CLK or CLK* clocks the first, second, third and fifth flip-flops. In addition, the pulse train CLK is gated through AND gate 37/3 with the signal RUN to generate the pulse train SCLK (System CLocK).

The first flip-flop U51/1 has its K input tied low and its J input coupled to the signal STOP. Thus this first flip-flop is enabled only when the signal STOP is HIGH (i.e. output $Q_3$ of counter U22 is LOW). When the signal STOP becomes high and there is no clear signal, the next negative going pulse of CLK* transfers a HIGH and a LOW, respectively, to the Q and Q* outputs. The clear input CL of first flip-clop U51/1, and the clear inputs CL of second and third flip-flops U52/1 and U26/1, are connected to the signal LOAD*, generated at the Q* output of the fifth flip-flop U26/2. The Q output of first flip-flop U51/1 is connected to the J input of second flip-flop U52/1 and the Q* output of the first flip-flop is connected to the K input of the second flip-flop and used to enable an AND gate U37/8 which generates the multiplier serial clock pulse train MCLK used to clock the M1 and M2 registers during a multiplication operation. The Q output of second flip-flop U52/1 is connected to the J input of third flip-flop U26/1. When the Q output of the second flip-flop is HIGH and signal STOP* is low, the pulse train CLK clocks a HIGH and a LOW, respectively, to the Q and Q* outputs of the third flip-flop, which outputs generate the signals RUN* and RUN respectively.

The pulse trains RCLK and RCLK*, which clock the P1 through P4 registers and the M3 and M4 registers, are generated from one of two sources that are gated together in NOR gate U24/13. One source is the pulse train SCLK generated by AND gate U37/3 in which pulse train CLK is gated by signal RUN. A second source is from the output of AND gate U37/6 in which signal RCLKP is gated by the signal STOP. This second source is a single pulse which is true during any write to the Multiplier Processor and is used to write information (i.e. load) into an enabled register. The single pulse is terminated when signal STOP goes false and disables AND gate U37/6, and this occurs upon the triggering of an arithmetic function, described below. The pulse train SCLK, the first mentioned source of RCLK and RCLK*, is generated primarily for the purpose of clocking the serial circuits during an arithmetic operation, described below. When the signal RUN goes true (during an arithmetic operation, AND gate U37/3 is enabled and pulse train CLK appears at the output of the gate as pulse train SCLK.

Fourth flip-flop U20/2 has its K input tied low and thus is enabled whenever a HIGH signal is applied to the J input and its clear input CLR is HIGH. The J input is connected to the output of an OR gate U23/8, the inputs of which are the signals EXEC (EXECute-must be HIGH to run multiplication) and RND (RouND), obtained from lines A4 and A8, respectively of address bus 38. The clear input is HIGH when signals LOAD* and RDLO* are both high (i.e. most of the time except at the beginning of a Processor Read or Write operation or at the beginning of the reading of the second word in a double precission read.) These two signals are gated together in an AND gate U40/8. The flip-flop U20/2 is clocked by the signal GO (generated by flip-flops U47/2, FIG. 2 at the beginning of a Multiply Processor access cycle). The Q output of fourth flip-flop U20/2, denoted the signal START, thus provides a short pulse only at the beginning of each Multiplier Processor multiply or round functions, as opposed to the beginning of each access like BDSEL* (See FIGS. 7 and 8).

The signal START is applied to the J input of the fifth flip-flop U26/2. This flip-flop is wired as a D-type flip-flop and is cleared after initiation of the current Serial Processor function. Thus, until the signal START has been provided with a positive pulse, fifth flip-flop U26/2 stays disabled. When the START pulse is generated, the HIGH is clocked through the flip-flop to the Q output by a pulse in the pulse train CLK. The HIGH Q output is then applied to the K input and at the next negative going pulse of CLK, the flip-flop is toggled, and the Q output becomes LOW. Thus a highly accurate very short signal LOAD* is produced (see FIGS. 7 and 8). The fifth flip-flop is held in the off state by the application of the signal RUN* from the Q output of the third flip-flop, U26/1.

Returning now to FIG. 1B, also coupled to the Multiplier Processor data bus 20 is a status latch U3 for receiving four error signals ILGADD, RRER, DSBER, and OVF. If an error is signaled to the computer (through an interrupt generated by the circuitry of FIG. 5), the computer can latch the specific error signal in latch U3 and then read the signal by enabling the output by generating a signal OESTAT*. In effect, latch U3 acts as a flag register and transfers its data from the inputs of an internal register for clocking onto data bus 20 when latch U3 is itself clocked by signal CPSTAT, generated by the circuitry in FIG. 5 when the interrupt signal is generated.

With reference to FIG. 1A, straddling data bus 20 and connected to it and to corresponding elements of each other are four multiplier registers M1, M2, M3 and M4, and four product registers, P1, P2, P3, and P4. The M1 register, comprised of integrated circuits U34 (containing the Least Significant Bit) and U33, and the M2 register, comprised of integrated circuits M31 (containing the Most Significant Bit) and U32, store the multiplicand number and contain the actual multiply hardware circuitry. Integrated circuits U31, U32, U33 and U34 are cascaded, and preferably are 8-bit serial/parallel two's compliment multipliers, such as integrated circuit device Am25LS14, manufactured by Advanced Micro Devices, Inc. These devices accept an 8-bit multiplicand at their x inputs from data bus 20 and store this data in 8, respective internal latches. The latches are controlled through the clear (CL) input. When the clear input is low the internal flip-flops are cleared and the latches are receptive to accepting new parallel data. When the clear input is high, the latches are closed and are insensitive to any input changes. Driving the clear inputs of register M1 is a signal which is LOW when both the signal LDM1* and a further signal are LOW. This further signal is LOW when the RCLKP signal is HIGH and the RUN* signal is HIGH. The clear input to the M2 register is similarly derived except that the signal LDM2* is used. The LDM1* and LDM2* signals are derived from memory access control signals generated by the CPU as a three digit code and transmitted on the three low order address lines, described hereinabove. The RCLKP and the RUN* signals are both high when the host computer is writing to memory and when it is simultaneously addressing the Multiplier Processor, also described hereinabove. Serial outputs from registers M1 and M2 are provided by the serial output port "S" of unit 34 as signal DPROD and from serial output port "S" of unit 32 as signal SPROD. The integrated circuits that comprise registers M1 and M2 utilize the Booth algorithm in performing the multiplication. The product is developed one bit for each low to high transition of signal MCLK. Signal MCLK must cycle an appropriate number of times which is equal to the number of bits of the multiplier plus the number of bits of the multiplicand.

Registers M3 and M4 are each comprised of two 8 bit parallel/serial shift registers with sign extend, such as integrated circuit devices 25LS22 manufactured by Advanced Micro Devices, Inc. The M3 and M4 registers are used to store and manipulate the multiplier arguments with only register M3 being used for single precision multiplication. Synchronous, parallel loading of either the M3 or M4 registers is accomplished by generating a low signal from the corresponding unit 11 AND gate driven by the STOP signal and either the LDM3* or LDM4* signals. The LDM3* and LDM4* signals, like the LDM1* and LDM2* signals are decoded from the low order address bits, as described hereinabove. The signal STOP is used to enable the registers to respond to the clock signal (RCLK) during serial operations (signal STOP is false or low) and to prevent parallel loading at other times. The LDM4* signal holds the register enable inputs RE LOW during the parallel loading of the respective registers. The parallel loading of registers M3 or M4 is selected by the signal RUN when it is normally LOW. However, during multiplication operations, the signal RUN is HIGH, thereby selecting the serial mode of operation. The data is clocked out of registers M3 and M4 when in the serial mode by the pulse train RCLK, which is derived as explained hereinabove. Finally, it is necessary to extend the sign of the multiplier to provide the proper sign information to the multiplicand registers for the balance of the clock cycles after all of the multiplier significant bits have been shifted into the multiplicand registers. Signal DBLP is applied to the SE* input of unit 8 of register M3 to cause the sign of the multiplier to be extended by unit 8 during single precision multiplications (DBLP in the low state). During double precision multiplications, the multiplier is sign extended by unit 6 of M4 because the SE* input is permanently tied low and unit 8 of M3 is serially concatonated to unit 7 of M4. Signal DBLP is obtained from the latched low order address bus (bit A7).

Four product registers P1, P2, P3 and P4, each 16 bits long, are required for double precision multiplication. The number of bits in a binary product is equal to the sum of the number of bits in the multiplier and the number of bits in the multiplicand minus one. Because double precision multiplication is the multiplication of two 32 bit numbers, the resulting product is 64 bits long. However, the low order 16 bits for single precision multiplication and 32 bits for double precision multiplication (contained in register P3 and in registers P1 and P2, respectively) are discarded after a single precision read with round operation and a double precision read with round operation, respectively. As explained in greater detail hereinbelow, the round function is accomplished by adding a "one" to the 17th bit and the 33rd bit, respectively.

The product registers P4, P3, P2, and P1 are each comprised of two 8 bit parallel/serial shift registers, units 11 and 12, 13 and 14, 16 and 17, and 18 and 19, respectively. These shift registers are concatenated together by connecting the Q output of one to the serial input DB of the next one. The serial input DB of unit 11, the most significant register, is labelled the signal ACCIN(ACCumulator INput), which is generated by the circuitry depicted in FIG. 1C. In the present embodiment, the integrated circuit devices comprising the product registers are the same as the devices comprising registers M3 and M4, namely 25LS22.

Each of the four product registers can be individually written to by the host computer so that the product of the multiplication can be added to or subtracted from the number in the product registers. Parallel loading of each register occurs when the appropriate command (see Table 1) is decoded from the low order address bits, as described above. Parallel loading thus occurs when the signal RUN is LOW and when the corresponding load signal (LDP4*, LDP3*, LDP2*, or LDP1* signals) is LOW. The processor load signals disable a corresponding AND gate U38 and are derived by decoder U43 from the three low order address bits, as described above (see FIG. 3). The output from the corresponding AND gates U38 is connected to the register enable input RE of each pair of integrated circuits comprising the product register. Thus, when the corresponding processor load signal is low, the output of the corresponding AND gate U38 is also low and the corresponding product register is enabled. Because the signal RUN is always low before the multiplication or round operations, the shift registers will be in the parallel mode at the time the data is written by the host computer to the multiplier processor. As soon as the signal RUN goes high, all of the product registers are shifted to the serial mode.

As mentioned above, the serial input of the product registers are coupled to the serial output of the preceding register with the input of the high order shift register U11 being connected to the output of arithmetic circuit 42 and the signal ACCIN. The shift registers comprising the product registers have two serial inputs, input DA and input DB. The particular input is selected by the multiplexer select input S, which when LOW, the serial input DA is selected and when HIGH, serial input DB is selected. In all of the integrated circuit devices comprising the product registers, with the exception of the high order device of product register P2 (i.e., device U16), the multiplexer select input S is tied HIGH. In device U16, serial input DB is tied to the serial output of the preceding shift register device and serial input DA is connected to receive signal ACCIN. The select input S of device U16 is connected to receive signal DBLP (DouBLe Precision) generated by the computer in the low order address, address bit A7 (see FIG. 3). Serial input DA of device U16 is connected to the output of arithmetic circuit 42 to receive signal ACCIN. Thus, when a double precision operation is to be performed by the multiplier processor, the input to product register P2 is connected to the output of product register P3, and when a single precision operation is to be performed (i.e. signal DLBP is LOW), the input to product register P2 is connected to also receive the signal ACCIN input simultaneously with the serial input to product register P4.

The clock input CP of each integrated circuit device comprising the product registers is connected to receive pulse train RCLK. Thus, when signal RUN is HIGH, placing all of the shift registers in the serial mode, the data in all of the shift registers are synchronously shifted to the right on a LOW-to-HIGH transition of the clock pulses of pulse train RCLK. Shift register device U19 of product register P1 contains the least significant bits and its serial output Q is connected to the input of arithmetic circuit 42, depicted in FIG. 1C.

The integrated circuit devices comprising the product registers (devices 25LS22) are also provided with a sign extend function which is used to repeat the contents of the $Q_7$ flip-flop of the shift register containing the most significant bit as the register is shifted to the right. To enable this function, a LOW signal is applied to the input SE of shift register device U11 during double precision operations and, through an OR gate U23/6, disabled during double precision operations with signal DBLP, is applied to shift register device U16 during single precision operations. The sign extend input SE of all of the other shift registers is tied HIGH. The generation of the sign extend signal SE* is discussed below with respect to FIG. 6.

A parallel read of the desired product register is performed by applying a LOW signal to the output enable input OE* of the appropriate shift register devices comprising the desired product register. The output enable input OE of product registers P1 and P2 are respectively connected to receive signals EOP1* and EOP2*, decoded from the low order address bus by decoder U44 in FIG. 3. However, the connection to the input OE of product registers P3 and P4 is more complicated because of the necessity to read selectively these registers during single precision and double precision rounding operations.

During single precision operations, the 32 bit product is stored in product register pairs P3 and P4 and P1 and P2, redundantly, due to the serial input DA of shift register U16 being selected. For a single precision multiplication operation, the rounded result is read from product register P4.

For a double precision multiplication operation, the 32 bit rounded result is read from product registers P3 and P4. The JK flip-flop U20/1 and the decoding gates connected to it are used to determine which shift register pair of product registers P3 and P4 are to be enabled during the product read. Flip-flop U20/1 acts as a counter to determine whether the P4 register has been read and if so, on the next read cycle to provide a signal RDLO* to enable product register P3 and disable product register P4.

As mentioned above, the enable circuitry for product registers P3 and P4 includes flip-flop U20/1 which is wired as a D-type flip-flop. The clear input CL of flip-flop U20/1 is connected to receive signal RESET* generated by the host computer. Thus, flip-flop U20/1 comes up in the clear state. The J input is clocked to the Q output when the clock input CP goes low. The clock input CP is connected to receive a signal DR, generated by the circuitry in FIG. 4 at the same time the host computer is sent a signal DTACK* that the data is ready. Flip-flop U20/1 is clocked on the high to low transition of signal DR. The J input of flip-flop U20/1 is connected to the output of an AND gate U41/11. Signal DBLP enables AND gate U41/11 when a double precision operation is ordered by the host computer. The other input to AND gate U41/11 is connected to the output of a NOR gate U24/1. One input to NOR gate U24/1 is connected to receive signal RND* so that AND gate U41/11 will be disabled whenever a round operation is not being performed. Thus, flip-flop U20/1 is enabled only when a double precision round operation is being performed. The outputs Q and Q* of flip-flops U20/1 generate the signals RDLO (Read LOw word) and RDLO*, respectively. Since flip-flop U20/1 is wired as a D-type flip-flop, the input K is connected to the output Q and receives signal RDLO. Signal RDLO also provides the second input to NOR gate U24/1 so that the gate is enabled only when the flip-flop is in the reset condition.

The output Q* (i.e., signal RDLO*) of flip-flop U20/1 is connected to one input of an AND gate U40/11 and one input of a NAND gate U39/6. The other input of NAND gate U39/6 is connected to the signal RND, and the output is connected to one input of an AND gate U40/3. The output of AND gates U40/11 and U40/3 are connected to the output enable inputs OE of product registers P3 and P4, respectively. Thus, when either of these gates is true, the corresponding product register is disabled from providing parallel output data. The other input to these AND gates U40/11 and U40/3 is provided by the P register output enable signals OEP3* and OEP4*, respectively. In this way, product registers P3 and P4 can be rear either during a simple register read operation commanded by the host computer or, automatically in the proper sequence by a single precision or double precision round command (see Table 1).

Signal RDLO generated by flip-flop U20/1 is also used to generate a signal RER (Round Read ERror flag). A two-input AND gate U40/6 gates signal RDLO with a signal RCLKP (Register CLock Pulse) generated by the circuitry depicted in FIG. 4, which is HIGH when there is a processor load operation in progress. Thus, signal RRER will be true when the low order word of product register P3 has not been read before the host computer attempts to write or load another product or multiply register.

Finally, with respect to FIG. 1A, all of the register clear inputs CL of the product registers is connected to an NAND gate U42/12. The product registers are asynchronously cleared when the output of NAND gate U42/12 is a LOW signal. NAND gate U42/12 is a three input gate and the inputs are each connected so as to receive signals CLACC, LOAD, and RND*. Signal CLACC (CLear ACCumulator) and, as mentioned above, signal RND is decoded from the low order address to the processor. The signal LOAD, as mentioned above, is generated by the circuitry depicted in FIG. 3 and is normally LOW except at the beginning of a multiply or round operation. Thus, upon command by the host computer, all of the processor registers can be simultaneously cleared when desired. This will normally occur when it is desired to simply multiply two numbers with each other and not to add or subtract them to a third number.

With reference to FIG. 1C, the arithmetic circuit 42 and an overflow error detection circuit 44 will now be discussed. Arithmetic circuit 42 is comprised of two four-one multiplexers U30/1 and U30/2, a serial adder/subtracter U15/2, a delay circuit comprised of a second serial adder/subtracter U15/1, and a decoder circuit 46. Adder/subtracter U15/2 in the present embodiment is comprised of one-fourth of an integrated circuit device 25LS15 commercially available from Advanced Micro Devices, Inc. This device is a serial two's complement adder/subtracter suitable for use in association with the multiplier integrated circuits that comprise multiplier registers M1 and M2. Adder/subtracter U15/2 adds the signal at input A with the signal at input B when the signal at input S is LOW, and subtracts the signal at input B from the signal at input A when the signal at input S is HIGH. A common clear signal used at a clear input CL (shown in a third adder/subtracter U15/3 in error detection circuit 44) asynchronously resets the sum flip-flops and hence the output F of all of the four adder/subtracters become a LOW signal, and when the signal at the S input is LOW, resets its four carry flip-flops, otherwise it sets them. Similarly, there is a common clock input CP (shown in adder/subtracter U15/1). The internal flip-flops of each adder/subtracter change state on the LOW-to-HIGH transition of the signal applied to clock input CP.

In adder/subtracter U15/2, the A input is connected to the output F1 of delay device U15/1. The input B of adder/subtracter U15/2 is connected to the output of multiplexer U30/1. The select input S of adder/subtracter U15/2 is connected to the output of decoder circuit 46, and the output F provides signal ACCIN, discussed hereinabove, and is also connected to an input of error detection circuit 44. The single clock input CP is connected to receive pulse train RCLK, and the single clear input CL is connected so as to receive signal LOAD*. Thus, all of the adder/subtracter devices U15/1, U15/2, and U15/3 are initially cleared at the beginning of each processor operation.

Decoder circuit 46 is comprised of an inverter U35/10 connected to receive signal RND (provided by the host computer in the low order processor address) and produces the inverted signal RND*. The output of inverter 35/10 is connected to one input of a two-input AND gate U37/11. The other input of AND gate U37/11 is connected to the signal SUB, also provided by the host computer in the low order processor address. Thus, adder/subtracter U15/2 is set up for addition when the host computer provides a signal SUB that is LOW or when the host computer is calling for a round operation. In a round operation, adder/subtracter U15/2 is used to add a generated HIGH pulse (a numeric 1) to a predetermined bit as it is clocked from the product registers. However, an integral part of the round operation is the scaling of the product (i.e., multiplying by a power of 2 within the range of +14 to −14 for single precision and +30 to −30 for double precision). The actual power of 2 to be utilized in a given instance is specified in the low order address bits supplied to the processor by the host computer. These low order address bits select a specific address in mapping PROM unit 10 which contains a binary bit pattern that is loaded into counters (units 21 and 22). Decoding logic connected to the Q outputs of the counters and also to the carry output of unit 21 generates a pulse at the proper time to affect the rounding operation. The binary bit pattern loaded into the counters controls the number of clock cycles generated before and after the round pulse. the number of clock cycles before the round pulse determines the scale factor applied to the contents of the P registers prior to the rounding operation. The round pulse occurs on the 16th and the 32nd clock cycle to implement a scale factor of 2° for single and double precision, respectively by adding a numeric 1 in adder/subtracter U15/2 to the 16th bit or 32nd bit, respectively, clocked out of the product registers. Decreasing the number of clock cycles before the round pulse applies a scale factor of a positive power of 2 and increasing the number of clock cycles applies a scale factor of a negative power of 2 proportional to the change in the number of clock cycles.

Multiplexer U30/2 is used to select the A input for adder/subtracter U15/2 from either the serial output of product register P1 or from signals SPRND* or DPRND*. In the present embodiment, both multiplexer U30/1 and U30/2 are integrated circuit devices 54LS153 wherein the select inputs A and B (depicted on multiplexer U30/2) select the input as follows:

| SELECT INPUTS | | SELECTED DATA INPUT | |
|---|---|---|---|
| A (DBLP) | B (RND) | U30/1 | U30/2 |
| LOW | LOW | $\left(\dfrac{1C0}{DPROD}\right)$ | $\left(\dfrac{2C0}{Q\ fm\ P1}\right)$ |
| HIGH | LOW | $\left(\dfrac{1C1}{SPROD}\right)$ | $\left(\dfrac{2C1}{Q\ fm\ P1}\right)$ |
| LOW | HIGH | $\left(\dfrac{1C2}{Q\ fm\ P1}\right)$ | $\left(\dfrac{2C2}{SPRND*}\right)$ |
| HIGH | HIGH | $\left(\dfrac{1C3}{Q\ fm\ P1}\right)$ | $\left(\dfrac{2C3}{DPRND*}\right)$ |

The enable inputs G for multiplexers U30/1 and U30/2 are tied low so that the corresponding multiplexers are always enabled. Therefore, it can be seen that when the multiplier processor is performing a simple multiplication, a multiply and add, or a multiply and subtract operation, the selected multiplier output SPROD or DPROD (depending upon whether signal DBLP is LOW or HIGH) applied at input B of adder/subtracter U15/2 is added to (signal SUB is LOW) or subtracted from (signal SUB is HIGH) the serial output from product register P1 applied at input A or adder/subtracter U15/2. When the multiplier processor is performing a round operation (signal RND is HIGH), the serial output from product register P1 applied at input B of adder/subtracter U15/2 is always added (signal RND* is LOW disabling AND gate U37/11) to the selected signal SPRND* or DBRND* (for single precision or double precision operations where signal DBLP is LOW or HIGH, respectively) applied at input A of adder/subtracter U15/2.

The contents of the product registers are delayed by one clock pulse in device U15/1 before being applied to input A of adder/subtracter U15/2 to align the bit patterns of the product from multiplier registers M1 or M2 (signals DPROD or SPROD, respectively) and the contents of the product registers.

Figure 8:
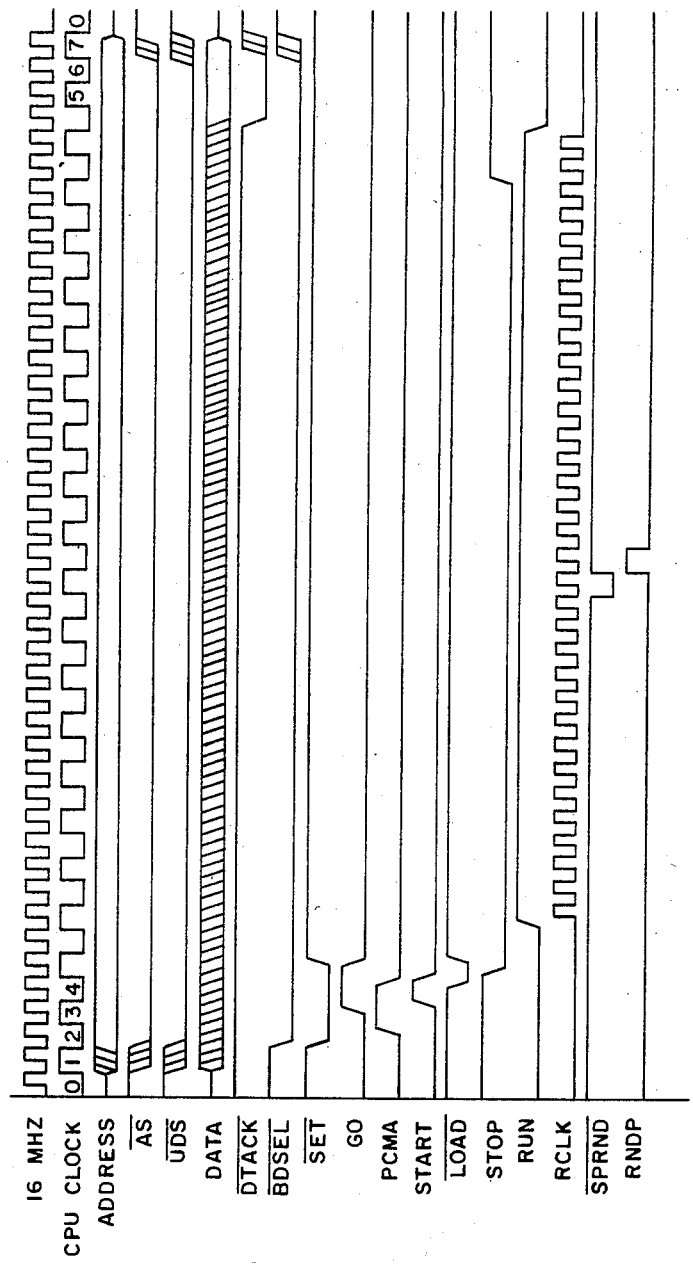
FIG. 8 is a timing diagram depicting waveforms of selected signals during the performance of single precision scaling and rounding of a read answer calculated by the present invention.

Overflow error detection circuit 44 (FIG. 1C) detects any two's complement overflows in relation to any arithmetic operation performed by adder/subtracter U15/2. Flip-flop U51/1, wired as a D-type flip-flop, and JK flip-flop U27/2 comprise the major timing logic circuitry of error detection circuit 44 in order that an overflow signal is generated thereby only during a comparison of the sign bits of the two operands being added or subtracted. The clock inputs to flip-flops U51/1 and U27/2 are connected to the output of an AND gate network 45 that gates pulse train RCLK* with signals STOP and RUN. As seen in FIG. 8, for example, only the last two clock pulses of RCLK* pulse train appear at the output of network 45 and simultaneously clock flip-flops U51/1 and U27/2.

Two exclusive-type gates, an exclusive NOR gate U29/13, and an exclusive OR gate U29/3, are respectively connected at one input to the outputs of adder/subtracter U15/1 and multiplexer U30/1. The other input of exclusive OR gate U29/3 is connected to the output of a gating circuit 46 and the output of exclusive OR gate U29/3 is connected to the other input of exclusive NOR gate U29/3. Gating circuit 46 provides a LOW output when the decoded address indicates that the operation being performed is an add (Signal SUB is LOW) or there is a round operation to be performed (Signal RND* is HIGH). The output of exclusive NOR gate U29/13 is gated with the Q output from flip-flop U51/1 by an AND gate U50/8 and the result applied to the J input of flip-flop U27/2.

The result of exclusive OR gate U29/3 is also connected to one input of an adder/subtracter device U15/3, which is wired as a one clock delay circuit. The output of device U15/3 is connected to one input of an exclusive NOR gate U29/9, the other input of which is connected to receive signal ACCIN, the result of the addition or subtraction of the two operands. The output of NOR gate U29/9 is gated with the Q* output of flip-flop U51/1 and the result applied to the K input of flip-flop U27/2. Signal OVF, indicating an abnormal overflow condition will be generated by flip-flop U27/2 after HIGH and LOW signals are respectively applied to its J and K inputs and are clocked through to the outputs.

Overflow error detection circuit 44 operates as follows. Exclusive NOR gate U29/13 in conjunction with exclusive OR gate U29/3 compares the two operands being added or subtracted and the result of the comparison is available for use only during the time interval between the third from the last and the second from the last clock cycle of the pulse train RCLK*. It is at this time that the respective sign bits of the two operands are available, the operands being clocked out one half cycle ahead by pulse train RCLK. A HIGH output is generated by exclusive NOR gate U29/13 when the bits of the two operands being added or being subtracted are the same or are different, respectively. If a HIGH output is present at this interval, then flip-flop U27/2 is set by the second from last clock pulse of pulse train RCLK*, and overflow signal OVF is generated. However, as seen in FIG. 5, before an error signal MOVFER* can be generated, signal RUN* must be HIGH, and this condition occurs only after the last clock pulse of pulse train RCLK*. Thus, the error signal MOVFER* will be generated unless flip-flop U27/2 is cleared by the last clock pulse of pulse train RCLK*.

Returning to FIG. 1C, device U15/3 takes the sign bit input of the "B" operand to adder/subtracter U15/2, or its compliment, during addition or subtraction, respectively, and delays it by one clock pulse. The delayed sign bit is compared with the sign of the result from adder/subtracter U15/2 (i.e part of signal ACCIN) by exclusive NOR gate U29/9. If the "B" operand sign bit is the same as the sign bit of the result during addition, or is the opposite during subtraction, a HIGH signal is generated by exclusive NOR gate U29/9.

The two timing control AND gates U50/8 and U50/11 are enabled by the decoded timing so as to allow the output from exclusive NOR gate U29/9 to be applied to the K input to flip-flop U27/2 prior to the last clock pulse of the RCLK pulse train. If the output of U29/9 is HIGH, then a HIGH is applied to the K input of flip-flop U27/2 and the last clock pulse of pulse train RCLK* clears the flip-flop. If, on the other hand, the output of U29/9 is LOW, indicating the previously specified conditions are not true, then flip-flop U27/2, having been previously set by the second from the last clock pulse of pulse train RCLK* applied to the "J" input thereof, remains set at the last clock pulse of pulse train RCLK* and generates signal OVF indicating an overflow condition.

Stating the foregoing somewhat differently, flip-flop U27/2 is set on the second from last clock pulse of pulse train RCLK* if the sign bits of the two inputs to adder/-subtracter are the same during addition or if they are different during subtraction. The flip-flop U27/2 is cleared on the last clock pulse of pulse train RCLK* if the abnormal result of the sign bit of the "B" operand (i.e. the B2 signal input to adder/subtracter U15/2) is the same as or different from the sign bit of the result from adder/subtracter U15/2 (i.e. signal ACCIN) during addition or subtraction, respectively. As described below, signal OVF when true means that the sign bit in the result has been written over and the number is invalid.

Turning now to FIG. 4, a handshake circuit 48 is depicted for generating a signal DTACK* used directly by the host computer (a 68000 microprocessor in the present embodiment). DTACK* is used to signal the host computer when the Multiplier Processor has completed its CPU transaction. The logic of circuit 48, as should be obvious to those skilled in the art, will depend upon the requirements of the host computer. For the 68000, signal DTACK* is active or true when LOW. Signal DTACK* is generated by circuit 48 after a write operation to the Multiplier Processor, after a simple read operation to the Multiplier Processor, and after a round and scale operation.

During a write operation, a true LOW signal is generated by an inverter 45/2 when the output of a triple input NOR gate 46/6 goes HIGH. The output from NOR gate 46/6 also generates signal RCLKP. Signal RCLKP is used to enable NAND gate U49/6 to initiate loading of the computer selected one of registers M1 and M2 before signal RUN* goes LOW and to enable AND gate U40/6 for the generation of error signal RRER (FIG. 1A). Signal RCLKP also is used to generate an extended signal RCLK pulse for loading the appropriate M3, M4 or P register when signal STOP (FIG. 3) is also HIGH and has enabled AND gate U37/6 NOR gate U46/6 is HIGH when the host computer generates a true or LOW write signal (signal R/W* is LOW and hence signal BR/W* is LOW) and generates a true LDS* signal (LOW on a host computer read or write when data on the computer data bus in valid), and when signal REN* is true. Signal LDS* provides a delayed timing control to permit data to be set up on Processor data bus 20. Signal LDS* is necessary because in some circumstances, the Processor could generate a true signal REN* before the host computer generates signal LDS*. Such a situation could load unstable data into one of the registers when signal RCLK goes HIGH (see FIGS. 3 and 1A).

During a read operation, a true LOW signal is generated by an inverter U45/4 when the output of a triple input NOR gate U46/8 goes HIGH. The output from NOR gate 46/8 also generates a signal DR (Data Ready) used to clock flip-flop U20/1 during the first read of double precision round and scale operation and to enable a NOR gate U24/10 (FIG. 5), described below. NOR gate U46/8 is HIGH when the host computer generates a true or HIGH read signal, which is applied to NOR gate U46/8 through an inverter, when signal REN* is true LOW, as described above, and when a flip-flop U27/1 is set (i.e., the Q* output is LOW). Flip-flop U27/1 is normally SET except it is CLEARED by a LOW signal generated by NAND gate U42/6. This only occurs at the beginning of a scale and round function when PCMA, A8 and RDLO* are all HIGH. Signal A8 is used directly from the host processor address bus to prevent a timing race with PCMA which latches A8 in U5. Signal RDLO* in a HIGH state indicates that the current access is not the second access of a double precision scale and round operation. By clearing flip-flop U27/1 early in the scale and round function, the signal Data Ready (DR) which provides signal DTACK* to the host computer is delayed until the end of the processing of the function. Signal Run goes LOW (clocking U27/1 to the SET condition) when the processed data is finally available to the host processor.

The clear input CL of flip-flop U27/1 is connected to the output of a three-input NAND gate U42/6. The inputs to NAND gate U42/6 are connected to receive signal PCMA (a HIGH pulse after the Processor has been addressed), signal RDLO (HIGH during the second read cycle following the first read when a double precision round and scale operation has been ordered) and a signal A8 which is taken from the same address line that generates signal RND, but before the latch U4 to ensure that flip-flop U27/1 is cleared early in the round and scale operation. Signal PCMA is used so as to prevent a false clear of flip-flop U27/1 that might otherwise occur during an access by a host computer while the Processor is busy (RUN is gated with SET*, FIG. 2). Flip-flop U27/1 is set by signal BDSEL, which is LOW when the Processor is not being addressed by the host computer. When set, the Q* output is LOW and NOR gate U46/8 is enabled.

With reference to FIG. 5, there is depicted an error signal generation circuit 50 that uses appropriate logic to generate error signals MADDER (Multiplier ADDress ERror) and MOVFER* (Multiplier OVerFlow ERror), in turn used to cause an interrupt of the host computer.

In the present embodiment, the host computer's 68000 Microprocessor is capable of individual byte addressing (high or low order) and word addressing. Because the intent of this particular design of the depicted embodiment is to enhance computational thruput and minimize hardware, the additional control circuitry required to implement byte addressing is not included in this embodiment. Error signal generation circuit 50 includes an EXCLUSIVE-OR gate U29/7 used to generate a signal DSBER (Data Strobe Byte ERror) which is active HIGH. The inputs to gate U29/7 are connected to receive signals UDS* and LDS*, generated by the 68000 microprocessor during an upper byte address strobe and a lower byte address strobe, respectively. So long as word addressing is being performed, the output of gate U29/7 will be an inactive LOW signal. Signal DSBER is connected to status latch U3 (FIG. 1B) and to one input of a three input NOR gate U46/12, the other inputs of which are connected to receive signals RRER and ILGADD. The output of NOR gate U46/12 is connected to the active input of a two input NOR gate U24/10, the enable input of which is connected to receive the inverted signals DR and RCLKP, wired ORed together. Thus error signal MADDER cannot be generated until the Processor signals the host computer that its operation is completed (i.e. DTACK* true). This enabling of NOR gate U24/10 provides critical timing constraints that prevent early or improper interrupting of the host computer.

Error signal MOVFER* is generated by an NAND gate U39/8, the inputs of which are connected to receive signal RUN* and signal OVF. Signal OVF is generated by detection circuit 44 (FIG. 1C) and is valid only after the final clock cycle (i.e. when RUN* is HIGH). This signal indicates that the P registers contain invalid data because the sign bit has been written over. This could occur on a programming error where, for example, the P registers are loaded to three-quarters of full scale with a positive number and then added to the positive product of two numbers at half of full scale. This operation could result in a one in the most significant bit position of the P registers, thereby falsely indicating a negative result. The logic of overflow error detection circuit is such for example that signal OVF is active when the sign bit ends up negative on a summation of a positive product and a positive prestored number in the P registers or the sign bit ends up positive on the summation of a negative product and a negative number prestored in the P registers. A subtraction operation has similar criteria.

Circuit 50 is also used to generate a signal CPSTAT used to latch the error signal into status latch U3. Signal CPSTAT is generated by OR gating the two valid LOW signals CLSTAT* and MOVFER* with the valid HIGH signal MADDER. Thus status latch U3 is latched upon command by the host computer or upon the generation of either error signal MADDER or MOVFER*.

The signal SE* to extend the sign during Processor operations is generated in a sign extend circuit 52 depicted in FIG. 6. Circuit 52 includes an R-S flip-flop 54 set (i.e., SE* is High) by the inverted signal RNDP (FIG. 1C) or by signal CLSTAT* and initialized or held in the reset or clear mode by signals LOAD* and RND* when True (i.e., LOW), which are gated by an OR gate U23. The signals LOAD* and RND* are used to clear flip-flop 54 (generating signal SE*) at the beginning of a round and scale operation. Then, when during such an operation a round pulse, signal RNDP, is generated, either product register P4 or both product registers P2 and P4 will have the sign extend terminated as the Processor continues to clock them during the scaling phase of the operation.

Figure 7:
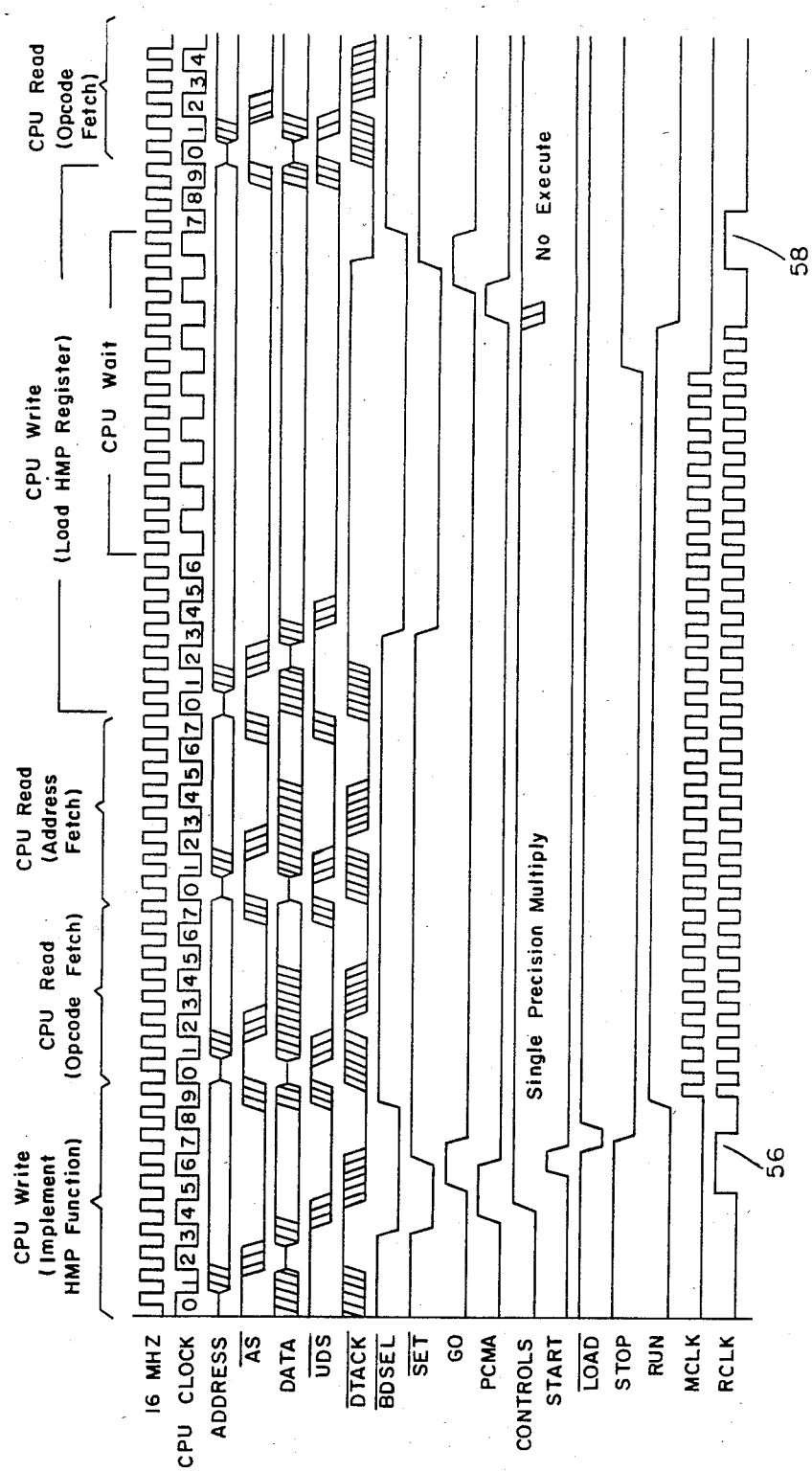
FIG. 7 is a timing diagram depicting waveforms of selected signals during the performance of single precision multiplication by the present invention.

The operation of a presently preferred embodiment of a hardware multiplier processor circuit according to the present invention can be best understood by first considering Table 1 and FIG. 7, which depicts the timing waveforms for part of a multiplication and add process. In this regard, consider that the processor is to perform the following operation:

$$A = (A \times B) + (C \times D)$$

For ease of explanation, this example will assume single precision mathematics, i.e., mathematics involving only 16 bit binary numbers.

First, the 68000 microprocessor will cause the multiplier processor to load the number "A" into register M3 by performing a memory write of the number "A" to memory address FE0C (HEX) (see Table 1). When the 68000 microprocessor performs the write to memory function, it sends out signals UDS* and LDS* as a LOW value, signal AS* as a LOW value, and signal R/W* as a LOW value. Address bits A9 through A23 are decoded by comparators U5 and U48 (FIG. 2) and product an active (i.e., LOW) signal BDSEL*. Signal BDSEL is thus HIGH and enables AND gate U41/8 (FIG. 1B), which gates signal R/W* to produce a LOW signal BR/W* which sets up transceivers U1 and U2 for the data write mode. These transceivers are enabled by the LOW signal BDSEL* and the number to be written by the microprocessor can be passed onto processor data bus 20. Turning to FIG. 2, signal BDSEL* clocks flip-flop U47/1 which generates a LOW signal SET*. Because a signal RUN has not been generated yet by second control signal generating circuit 30 (FIG. 3), the signal RUN is also LOW thereby enabling NOR gate U24/4 and generating a HIGH signal PCMA. Signal PCMA is then applied to clock latch U4 and latch the low order address bits A1 through A8 (FIG. 3).

The low order address (E0C) produces the following bit pattern for address lines A1 through A8: 00000110. The leading five zeros mean that all of the signals EXEC, CLACC, SUB, DBLP, and RND are LOW. Address lines A1, A2 and A3 result in a bit pattern as follows: 110. Because signal BR/W* is LOW, only decoder U43 (FIG. 3) is enabled. This decoder decodes the bit pattern and address lines A1–A3 to produce a LOW output at pin 9, thereby generating a LOW signal LDM3*. A LOW signal LDM3* (FIG. 1A) disables an AND gate U11/6 producing a LOW output therefrom which is coupled to enable units U8 and U9 of register M3. Because signal RUN is LOW at this time and because signal OEM3* is not generated by decoder U44 (FIG. 3), the units of register M3 are set up to be loaded in the parallel mode as soon as signal RCLK goes HIGH.

Signal RCLK is generated by circuit 30, FIG. 3. As can be seen from Table 1, the low order address bits (06 HEX) to the multiplier processor address PROM U10 and produce all zeros at the eight outputs. A zero at pin 14, the Most Significant Bit, means that the address was proper, indicated by signal ILGADD being not true. Because a signal LOAD* is not produced, the output data from PROM U10 is never loaded into counters U21 and U22. Therefore, the signal STOP* will be LOW and signal STOP will be HIGH, thereby enabling AND gate U37/6. Thus, signal RCLK goes HIGH to load register M3 when signal RCLKP goes HIGH, and this occurs when signal REN* goes LQW (FIG. 4). Turning to FIG. 2, it can be seen that initially when signal PCMA is generated, flip-flop U47/2 is clocked by the next clock pulse from the host computer clock, thereby generating a positive signal GO. At the same time that signal GO is generated, a negative going pulse from the Q* output of flip-flop 47/2 clocks a LOW from the input of flip-flop U52/2 to the Q* output to generate a LOW going signal REN*. Signal REN* goes HIGH when flip-flop U52/2 is cleared, and this occurs when signal BDSEL goes LOW and the processor is no longer being addressed.

As soon as signal REN* went LOW, and signal RCLKP went HIGH, an active signal DTACK* is sent to the host computer (see FIG. 4). At that point, the host computer fetches the number "B" from its memory and then writes that number to the multiplier processor using address FE3E (HEX). By writing to this address, the host computer causes a number of operations to take place. The waveforms for this operation are shown in FIG. 7. By writing to address FE3E, the register M2 is loaded with multiplicand "B" in the same way that the number "A" was written to register M3. However, two additional signals are generated from the low order address bytes, namely signals EXEC and CLACC. By generating these two signals, product registers P4 through P1 are cleared and the multiplier hardware is initialized and started with the result that a single precision multiplication of number "A" to "B" is performed and the product accumulated in both registers P3 and P4 and P1 and P2 (signal DBLP is LOW selecting ACCIN as input).

With reference to FIG. 7, the broad pulse 56 for signal RCLK represents the writing of the number "B" to register M2. Now however signal EXEC enables flip-flop U20/2 (FIG. 3) and when the signal GO pulse is generated, flip-flop U20/2 is clocked and a pulse START enables flip-flop U26/2, which in turn is clocked on the next pulse of the host computer clock. When that occurs, signal LOAD and signal LOAD* are generated, counters U21 and U22 are loaded with the numbers 0110 and 000, respectively, from the output of PROM U10 (see Table 1). This number is the binary two's complement of the desired number of clock pulses (18) needed to accomplish single precision multiplication. With the generation of signal LOAD*, flip-flops U51/1, U52/1 and U26/1 are cleared, a HIGH signal RUN is generated to enable AND gate U37/3, and thus generate pulse train SCLK. Because signal RCLKP is gated by STOP in U37/6, which output is now LOW, OR gate U24/13 is enabled and permits pulse train SCLK to generate pulse train RCLK. Because AND gate U37/8 has been enabled when flip-flop U51/1 was cleared, pulse train SCLK is at the same time also generating pulse train MCLK. As mentioned above, pulse train RCLK is used to clock the number stored in registers M3 and M4 into registers M2 and M1, and to clock the serial product into registers P4 and P3 and registers P2 and P1. Pulse train MCLK is used to clock Multiplier Registers M1 and M2.

As soon as signal DTACK* was generated by circuit 48 (FIG. 4), the host computer fetched the number "C" from its other memory (see top line, FIG. 7) and again addressed the Multiplier Processor. Now, however, the host computer is held off because of signal RUN being applied to disable NOR gate U24/4 (FIG. 2). This is represented at the top of FIG. 7 where the host computer (i.e., CPU) is shown to be in a wait state.

Turning to FIG. 1A, with the generation of a HIGH signal CLACC on address line A5, product registers P1 through P4 are cleared as soon as signal LOAD has been generated, NAND gate U42/12 having been previously enabled by signal RND* being HIGH. This ensures that when the product of numbers "A" and "B" are multiplied together, the result is not affected by anything previously stored in the product registers. Because of the two stage delay in the arithmetic circuit 42 (FIG. 1C), pulse train RCLK is two pulses longer than pulse train MCLK. The two pulse trains will both be produced as long as signal RUN is HIGH and signal STOP is LOW. Signal RUN continues to be HIGH until counters U21 and U22 count out and a zero appears at output Q3 of counter U22. This causes a zero to be clocked to the Q* output of flip-flop U26/1 and results in signal RUN going LOW and disabling AND gate 37/3. Two and a half CLK pulses earlier (pulse train CLK* is used to clock the flip-flop) flip-flop U51/1 had been enabled (its input J went HIGH), and a LOW was clocked to its Q* output. This caused AND gate U37/8 to be disabled and to stop the generation of pulse train MCLK.

Turning now to FIG. 1C, as registers M4 and M3 are clocked into registers M2 and M1, the serial output from the serial output S of unit 32 of register M2 (denoted SPROD) is simultaneously clocked into multiplexer U30/1. Because signals DBLP and RND are both LOW, multiplexer U30/1 passes the signal SPROD input to its output Y, and the output from unit 19 of P register P1 is selected and provided at the output of multiplexer U30/2. Because signal SUB is LOW (provided by the host computer in the low order address which specified the present operation to be a multiplication and add), AND gate U37/11 is disabled and serial adders U15/1 and U15/2 are set up for the addition mode. Further, because the product registers have been cleared and contain all zeros, and because signal RND is LOW, the selected outputs from multiplexer U30/2 into the input of serial adder U15/1 are all zeros, and the output from serial adder U15/1 is also all zeros. Thus, the selected signal SPROD, sent to the input of serial adder U15/2, is added therein to all zeros and produces an unaccumulated output as the signal ACCIN. As mentioned above, this signal is applied to the input of unit 16 of product register P2. Serial adders U15/1 and U15/2 are also clocked by pulse train RCLK in order to make it synchronous with the clocking of the M registers and the product registers.

After the last bit has been clocked into unit 16 of product register P2, and signal RUN goes LOW, the result can be read, if desired, by the host computer. However, in the present example, the computer has been waiting to write to register M3 the number "C". This is accomplished in the same way that the number "A" was previously written. The waveforms for writing the number "C" are also shown in FIG. 7, thereby accounting for a second wide pulsed signal RCLK, denoted 58.

The computer then fetches the number "D" and writes it to register M2. However, this time, the address FE1E (HEX) is used so that the product registers will not be initialized. As soon as the number "D" is written to register M2, the whole multiplication process is repeated, as explained above. This time, however, there will be a number stored in the product registers P2 and P1 (namely the product of "A" & "B"). Therefore, serial adder U15/2 serially adds the clocked product from P registers P2 and P1 to the clocked product from the registers M2 and M1. The result, as above, is stored in product registers P4 and P3, and P2 and P1. If desired, an unrounded product can be read from these registers, one register at a time, or the results can be rounded and scaled.

The rounding and scaling operation uses the Product Registers and circuit 42 (FIGS. 1A and 1C, respectively). The multiplier processor is addressed using a preselected address depending upon the type of scaling desired. In the example depicted in FIG. 8, the single precision rounding operation with no scaling is depicted. This time, however, the number loaded into counters U21 and U22 from PROM U10 represents 33 clock pulses so that the single precision product will be completely clocked through and properly rounded by adding a 1 to the 16th bit. The logic gate network depicted in FIG. 3 and connected to the outputs of counters U21 and U22 provide an active LOW pulse at the appropriate count. This pulse is applied at multiplexer U30/2 at the input 2C2 as signal SPRND*, and is selected as the output therefrom because signal DBLP is LOW and signal RND is HIGH. Thus, adder/subtracter U15/1 is set up to subtract SPRND* (normally a ONE, see FIG. 8) from a ONE (signal RND is HIGH). Consequently the result at output F1 (signal RNDP) is a zero until signal SPRND* goes LOW. At that point in time, the output F1 will be a ONE which is thereupon added one clock pulse CLK later in adder/subtracter U15/2 to the 16th bit from the serial output from product register P1, which output has been selected by multiplexer U30/1, as described hereinabove.

Should a scale operation be desired, more or less pulses than 15 are added ahead of the round pulse. If less pulses are added, then the scale factor is positive and the number is justified to the left. By adding more pulses ahead of the round pulse, the number is justified to the right. As should be obvious, justifying a number to the left, for example, two times, requires only 13 clock pulses prior to the RNDP signal and is equivalent to multiplying the number by a factor of two squared. Similarly, justifying the number twice to the right results in the number being divided by two squared Because the round and scale operation is performed by a read command from the host computer, signal BR/W* is HIGH and decoder U43 (FIG. 3) is disabled. Similarly, on a round and scale operation, decoder U44 is disabled because signal RND* is LOW. As soon as signal RUN goes LOW, flip-flop U27/1 (FIG. 4) is clocked and generates a HIGH signal DR and a true LOW signal DTACK*. When the host computer receives a true signal DTACK*, it will then read the information on data bus 22. The data to be read is transferred from processor data bus 20 to computer data bus 22 through transceivers U1 and U2, enabled in the "send" direction by a HIGH signal BR/W*.

The data is provided to processor data bus 22 from the appropriate product register due to the generation of a HIGH on output Q* of flip-flop U20/1 (FIG. 1A). The HIGH output is applied to a previously enabled NAND gate U39/6 (signal RND is HIGH), which in turn results in a LOW being applied to AND gate U40/3. The disabling of AND gate U40/3 applies a LOW signal to enable the outputs of register P4. Because signals OEP3*, OEP2* and OEP1* are all HIGH, product registers P3, P2 and P1, respectively, are disabled. In the double precision round and scale operations, it is noted that after register P4 has been read, flip-flop U20/1 is set up for clocking (by a high to low transition of signal DR) a LOW to the output Q* and selecting register P3 to be read next. This has been possible because under those circumstances, signal DBLP is HIGH and AND gate U41/11 is enabled.

A multiplier processor has been described with specific references to a presently preferred embodiment thereof. The present invention provides a hardware multiplier processor that performs 16 bit single precision multiplication with an optional addition or subtraction of the 32 bit product to a previous 32 bit result stored in an accumulator. The previous result can be either separately loaded or can be the result of a prior multiplication operation. Double precision multiplication using 32 bit numbers can also be performed with an optional addition or subtraction of the 64 bit product to a previously stored 64 bit number in the accumulator. Single precision scale operation has a range of $2^{+14}$ to $2^{-14}$, and can be rounded from the 32 bit product to a 16 bit result. Double precision numbers can be scaled within a range from $2^{+30}$ to $2^{-30}$, and rounded from the 64 bit product to a 32 bit product. In addition, the present invention can be used to scale previously loaded numbers without any multiplication taking place. The multiplication is accomplished simply by writing a number to the appropriate register and a number can be scaled simply by reading the number from the appropriate register. All arithmetic operations are performed with an independent clock that can operate at speeds completely independent of the speed at which the host computer is operating. Typically, the host computer has an 8 MHz clock and a 16 MHz clock is used for the multiplier processor. With the present invention, the host computer can either be held off pending completion of the present operations, or can independently continue some other operations in parallel with the operating processor. However, because the present invention can operate at a very rapid speed, the delay of a waiting host computer is minimized. For example, the host computer memory cycle is held off for a single precision scale by $2^0$ and round of only 2 microseconds (4 microseconds for a double precision scale) for the above clock rates. Worst case 68000 microprocessor wait times using the above clock rates are 3.3 microseconds for a single precision round and scale by $2^{-14}$ and 6.3 microseconds for a double precision round and scale by $2^{-30}$.

The present invention can be connected to a four channel optical isolated USART serial input/output board having an 8 channel priority interrupt controller and a 5 channel programmable 16 bit timer/counter.

Typical execution times of the presently preferred embodiment using a 16 MHz clock are 2.38 microseconds and 4.38 microseconds, respectively, for a single precision and double precision multiply and accumulate and a 3.31 microseconds and 6.31 microseconds for a single precision round and scale by $2^{-14}$ and double precision round and scale by $2^{-30}$, respectively. Comparison with a software calculation of a bench mark equation by a 68000 microprocessor based computer for a 32 bit fixed point calculation results in a speed increase by a factor of approximately 8. More specifically, in calculating equation $a_{11}=B_{11}\ C_{11}+B_{12}\ C_{21}+B_{13}\ C_{31}+K$, the microprocessor execution time was 235 microseconds whereas the present invention used in parallel with the same microprocessor had an execution time of 31 microseconds.

Thus, there has been described a hardware multiplier processor that can rapidly accomplish complex mathematical operations in parallel with a host computer. Multiplications are automatically performed by a simple write command and scale and round operations are performed by a simple read command. Duplicate use of the circuitry for these two operations together with the use of commercially available components provide a relatively, inexpensive, low power, flexible, memory mapped peripheral for a host computer.

While the present invention has been described with respect to a specific embodiment thereof, other modifications, changes and uses would be apparent to those of ordinary skill in the art.

TABLE 1
HARDWARE MULTIPLIER PROCESSOR MAPPING FROM AND BOARD ADDRESS DEFINITION BOARD ADDRESS = [(PROM ADDRESS) * 2] + FE00

| PROM ADD | BOARD ADD | PROM DATA 76543210 | FUNCTION |
| --- | --- | --- | --- |
| 000 | FE00 | 10000000 | ILLEGAL ADDRESS |
| 001 | FE02 | 00000000 | WRITE P4 (PRODUCT HI) |
| 002 | FE04 | 00000000 | WRITE P3 |
| 003 | FE06 | 00000000 | WRITE P2 |
| 004 | FE08 | 00000000 | WRITE P1 (PRODUCT LO) |
| 005 | FE0A | 00000000 | WRITE M4 (MULTIPLIER HI) |
| 006 | FE0C | 00000000 | WRITE M3 (MULTIPLIER LO) |
| 007 | FE0E | 00000000 | WRITE M2 (MULTIPLICAND HI) |
| 008 | FE10 | 00000000 | WRITE M1 (MULTIPLICAND LO) |
| 009 | FE12 | 10000000 | ILLEGAL ADDRESS |
| 00F | FE1E | 01100000 | WRITE M2, SP MULT & ADD |
| 010 | FE20 | 10000000 | ILLEGAL ADDRESS |
| 01F | FE3E | 01100000 | WRITE M2, CLR AC, SP MULT & ADD |
| 020 | FE40 | 10000000 | ILLEGAL ADDRESS |
| 02F | FE5E | 01100000 | WRITE M2, SP MULT & SUB |
| 030 | FE60 | 10000000 | ILLEGAL ADDRESS |
| 03F | FE7E | 01100000 | WRITE M2, CLR AC, SP MULT & SUB |
| 040 | FE80 | 10000000 | ILLEGAL ADDRESS |
| 047 | FE8E | 00000000 | WRITE M2 |
| 048 | FE90 | 01000000 | WRITE M1, DP MULT & ADD |
| 049 | FE92 | 10000000 | ILLEGAL ADDRESS |
| 057 | FEAE | 00000000 | WRITE M2 |
| 058 | FEB0 | 01000000 | WRITE M1, CLR AC, DP MULT & ADD |
| 059 | FEB2 | 10000000 | ILLEGAL ADDRESS |
| 067 | FECE | 00000000 | WRITE M2 |
| 068 | FED0 | 01000000 | WRITE M1, DP MULT & SUB |
| 069 | FED2 | 10000000 | ILLEGAL ADDRESS |
| 077 | FEEE | 00000000 | WRITE M2 |
| 078 | FEF0 | 01000000 | WRITE M1, CLR AC, DP MULT & SUB |
| 079 | FEF2 | 10000000 | ILLEGAL ADDRESS |
| 100 | FE00 | 00000000 | CLEAR STATUS REGISTER |
| 101 | FE02 | 00000000 | READ P4 |
| 102 | FE04 | 00000000 | READ P3 |
| 103 | FE06 | 00000000 | READ P2 |
| 104 | FE08 | 00000000 | READ P1 |
| 105 | FE0A | 00000000 | READ M4 |
| 106 | FE0C | 00000000 | READ M3 |
| 107 | FE0E | 00000000 | READ BOARD STATUS |
| 108 | FE10 | 10000000 | ILLEGAL ADDRESS |
| 180 | FF00 | 01100001 | SP ROUND * $2^{0}$ |
| 181 | FF02 | 01100000 | SP ROUND * $2^{-1}$ |
| 182 | FF04 | 01011111 | SP ROUND * $2^{-2}$ |
| 183 | FF06 | 01011110 | SP ROUND * $2^{-3}$ |
| 184 | FF08 | 01011101 | SP ROUND * $2^{-4}$ |
| 185 | FF0A | 01011100 | SP ROUND * $2^{-5}$ |
| 186 | FF0C | 01011011 | SP ROUND * $2^{-6}$ |
| 187 | FF0E | 01011010 | SP ROUND * $2^{-7}$ |
| 188 | FF10 | 01011001 | SP ROUND * $2^{-8}$ |
| 189 | FF12 | 01011000 | SP ROUND * $2^{-9}$ |
| 18A | FF14 | 01010111 | SP ROUND * $2^{-10}$ |
| 18B | FF16 | 01010110 | SP ROUND * $2^{-11}$ |
| 18C | FF18 | 01010101 | SP ROUND * $2^{-12}$ |
| 18D | FF1A | 01010100 | SP ROUND * $2^{-13}$ |
| 18E | FF1C | 01010011 | SP ROUND * $2^{-14}$ |
| 18F | FF1E | 10000000 | ILLEGAL ADDRESS |
| 1B2 | FF64 | 01101111 | SP ROUND * $2^{14}$ |
| 1B3 | FF66 | 01101110 | SP ROUND * $2^{13}$ |
| 1B4 | FF68 | 01101101 | SP ROUND * $2^{12}$ |
| 1B5 | FF6A | 01101100 | SP ROUND * $2^{11}$ |
| 1B6 | FF6C | 01101011 | SP ROUND * $2^{10}$ |
| 1B7 | FF6E | 01101010 | SP ROUND * $2^{9}$ |
| 1B8 | FF70 | 01101001 | SP ROUND * $2^{8}$ |
| 1B9 | FF72 | 01101000 | SP ROUND * $2^{7}$ |
| 1BA | FF74 | 01100111 | SP ROUND * $2^{6}$ |
| 1BB | FF76 | 01100110 | SP ROUND * $2^{5}$ |
| 1BC | FF78 | 01100101 | SP ROUND * $2^{4}$ |
| 1BD | FF7A | 01100100 | SP ROUND * $2^{3}$ |
| 1BE | FF7C | 01100011 | SP ROUND * $2^{2}$ |
| 1BF | FF7E | 01100010 | SP ROUND * $2^{1}$ |
| 1C0 | FF80 | 01000001 | DP ROUND * $2^{0}$ |
| 1C1 | FF82 | 01000000 | DP ROUND * $2^{-1}$ |
| 1C2 | FF84 | 00111111 | DP ROUND * $2^{-2}$ |
| 1C3 | FF86 | 00111110 | DP ROUND * $2^{-3}$ |

TABLE 1-continued
HARDWARE MULTIPLIER PROCESSOR MAPPING FROM AND BOARD ADDRESS DEFINITION BOARD ADDRESS = [(PROM ADDRESS) * 2] + FE00

| PROM ADD | BOARD ADD | PROM DATA 76543210 | FUNCTION |
|---|---|---|---|
| 1C4 | FF88 | 00111101 | DP ROUND * 2**-4 |
| 1C5 | FF8A | 00111100 | DP ROUND * 2**-5 |
| 1C6 | FF8C | 00111011 | DP ROUND * 2**-6 |
| 1C7 | FF8E | 00111010 | DP ROUND * 2**-7 |
| 1C8 | FF90 | 00111001 | DP ROUND * 2**-8 |
| 1C9 | FF92 | 00111000 | DP ROUND * 2**-9 |
| 1CA | FF94 | 00110111 | DP ROUND * 2**-10 |
| 1CB | FF96 | 00110110 | DP ROUND * 2**-11 |
| 1CC | FF98 | 00110101 | DP ROUND * 2**-12 |
| 1CD | FF9A | 00110100 | DP ROUND * 2**-13 |
| 1CE | FF9C | 00110011 | DP ROUND * 2**-14 |
| 1CF | FF9E | 00110010 | DP ROUND * 2**-15 |
| 1D0 | FFA0 | 00110001 | DP ROUND * 2**-16 |
| 1D1 | FFA2 | 00110000 | DP ROUND * 2**-17 |
| 1D2 | FFA4 | 00101111 | DP ROUND * 2**-18 |
| 1D3 | FFA6 | 00101110 | DP ROUND * 2**-19 |
| 1D4 | FFA8 | 00101101 | DP ROUND * 2**-20 |
| 1D5 | FFAA | 00101100 | DP ROUND * 2**-21 |
| 1D6 | FFAC | 00101011 | DP ROUND * 2**-22 |
| 1D7 | FFAE | 00101010 | DP ROUND * 2**-23 |
| 1D8 | FFB0 | 00101001 | DP ROUND * 2**-24 |
| 1D9 | FFB2 | 00101000 | DP ROUND * 2**-25 |
| 1DA | FFB4 | 00100111 | DP ROUND * 2**-26 |
| 1DB | FFB6 | 00100110 | DP ROUND * 2**-27 |
| 1DC | FFB8 | 00100101 | DP ROUND * 2**-28 |
| 1DD | FFBA | 00100100 | DP ROUND * 2**-29 |
| 1DE | FFBC | 00100011 | DP ROUND * 2**-30 |
| 1DF | FFBE | 00000000 | READ P3 |
| 1E0 | FFC0 | 00000000 | ILLEGAL ADDRESS |
| 1E1 | FFC2 | 01011111 | DP ROUND * 2**30 |
| 1E2 | FFC4 | 01011110 | DP ROUND * 2**29 |
| 1E3 | FFC6 | 01011101 | DP ROUND * 2**28 |
| 1E4 | FFC8 | 01011100 | DP ROUND * 2**27 |
| 1E5 | FFCA | 01011011 | DP ROUND * 2**26 |
| 1E6 | FFCC | 01011010 | DP ROUND * 2**25 |
| 1E7 | FFCE | 01011001 | DP ROUND * 2**24 |
| 1E8 | FFD0 | 01011000 | DP ROUND * 2**23 |
| 1E9 | FFD2 | 01010111 | DP ROUND * 2**22 |
| 1EA | FFD4 | 01010110 | DP ROUND * 2**21 |
| 1EB | FFD6 | 01010101 | DP ROUND * 2**20 |
| 1EC | FFD8 | 01010100 | DP ROUND * 2**19 |
| 1ED | FFDA | 01010011 | DP ROUND * 2**18 |
| 1EE | FFDC | 01010010 | DP ROUND * 2**17 |
| 1EF | FFDE | 01010001 | DP ROUND * 2**16 |
| 1F0 | FFE0 | 01010000 | DP ROUND * 2**15 |
| 1F1 | FFE2 | 01001111 | DP ROUND * 2**14 |
| 1F2 | FFE4 | 01001110 | DP ROUND * 2**13 |
| 1F3 | FFE6 | 01001101 | DP ROUND * 2**12 |
| 1F4 | FFE8 | 01001100 | DP ROUND * 2**11 |
| 1F5 | FFEA | 01001011 | DP ROUND * 2**10 |
| 1F6 | FFEC | 01001010 | DP ROUND * 2**9 |
| 1F7 | FFEE | 01001001 | DP ROUND * 2**8 |
| 1F8 | FFF0 | 01001000 | DP ROUND * 2**7 |
| 1F9 | FFF2 | 01000111 | DP ROUND * 2**6 |
| 1FA | FFF4 | 01000110 | DP ROUND * 2**5 |
| 1FB | FFF6 | 01000101 | DP ROUND * 2**4 |
| 1FC | FFF8 | 01000100 | DP ROUND * 2**3 |
| 1FD | FFFA | 01000011 | DP ROUND * 2**2 |
| 1FE | FFFC | 01000010 | DP ROUND * 2**1 |
| 1FF | FFFE | 00000000 | READ P3 |

TABLE 2
HARDWARE MULTIPLIER PROCESSOR UNIT NUMBER TO IC PART NUMBER CROSS REFERENCE

| Unit # | Device # | Function |
|---|---|---|
| 1-2 | 54C245 | 8 BIT BI-DIRECTIONAL BUFFER |
| 3-4 | 54LS374 | 8 BIT LATCH |
| 5 | 25LS2521 | 8 BIT EQUAL-TO COMPARATOR |
| 6-9 | 25LS22 | 8 BIT PAR/SER SHIFT REGISTER |
| 10 | MMI 5349 | FUSEABLE LINK PROM |
| 11-14 | 25LS22 | 8 BIT PAR/SER SHIFT REGISTER |
| 15 | 25LS15 | QUAD SERIAL ADDER/SUBTRACTOR |
| 16-19 | 25LS22 | 8 BIT PAR/SER SHIFT REGISTER |
| 20 | 54S112 | DUAL J-K FLIP FLOP |
| 21-22 | 54LS191 | 4 BIT UP/DOWN COUNTER |
| 23 | 54LS32 | QUAD 2 INPUT-OR GATE |
| 24 | 54LS02 | QUAD 2 INPUT-NOR GATE |
| 25-26 | 54S112 | DUAL J-K FLIP FLOP |
| 27 | 54LS112 | DUAL J-K FLIP FLOP |
| 28 | | 32 MHz OSCILLATOR |
| 29 | 54S135 | QUAD 2 INPUT EXCLUSIVE OR/NOR GATE |

TABLE 2-continued
HARDWARE MULTIPLIER PROCESSOR UNIT NUMBER TO IC PART NUMBER CROSS REFERENCE

| Unit # | Device # | Function |
|---|---|---|
| 30 | 54LS153 | DUAL 4-1 LINE MULTIPLEXER |
| 31-34 | 25LS14 | 8 BIT SER/PAR MULTIPLIER |
| 35 | 54S04 | HEX INVERTER |
| 36 | 54LS32 | QUAD 2-INPUT OR GATE |
| 37-38 | 54LS08 | QUAD 2-INPUT AND GATE |
| 39 | 54LS00 | QUAD 2-INPUT NAND GATE |
| 40-41 | 54LS08 | QUAD 2-INPUT AND GATE |
| 42 | 54LS10 | TRIPLE 3-INPUT NAND GATE |
| 43-44 | 54LS138 | 3-8 LINE DECODER |
| 45 | 5406 | HEX OPEN COLLECTOR INVERTER |
| 46 | 54LS27 | TRIPLE 3-INPUT NOR GATE |
| 47 | 54S112 | DUAL J-K FLIP FLOP |
| 48 | 25LS2521 | 8 BIT EQUAL-TO COMPARATOR |
| 49 | 54LS00 | QUAD 2-INPUT NAND GATE |
| 50 | 54LS08 | QUAD 2-INPUT AND GATE |
| 51 | 54LS112 | DUAL J-K FLIP FLOP |
| 52 | 54S112 | DUAL J-K FLIP FLOP |

TABLE 3

| SIGNAL | GENERATED BY | FUNCTION (NT = NEGATIVE TRUE) |
|---|---|---|
| A1-A20 | COMPUTER | ADDRESS INPUT (SPECIFIES BOARD FUNCTION) |
| AS* | COMPUTER | ADDRESS STROBE |
| ACCIN | U15/9(FIG 1C) | ACCUMULATOR SERIAL INPUT |
| BDSEL | U35/12(FIG 2) | BOARD SELECT |
| BDSEL* | U5/19(FIG 2) | BOARD SELECT INVERSE |
| BR/W* | U41/8(FIG 1B) | BUFFERED READ/WRITE (WRITE NT) |
| CLACC | U4/12(FIG 3) | CLEAR ACCUMULATOR |
| CLSTAT* | U44/15(FIG 3) | CLEAR STATUS REGISTER (NT) |
| CLK | U35/4 | 16 MHZ BOARD CLOCK |
| CLK* | OFF BOARD | CLK (NT) (16MHZ CLOCK) |
| CPSTAT | U23/3(FIG 5) | CLOCK STATUS REGISTER |
| DBLP | U4/16(FIG 3) | DOUBLE PRECISION |
| DPRND* | U36/6(FIG 3) | DOUBLE PRECISION ROUND PULSE |
| DPROD | U34/6(FIG 1A) | DOUBLE PRECISION PRODUCT |
| DR | U46/8(FIG 4) | DATA READY FOR CPU |
| DSBER | U29/7(FIG 5) | DATA STROBE BYTE ERROR |
| DTACK* | U45/2,4(FIG 4) | DATA TRANSFER ACKNOWLEDGE (NT) |
| EXEC | COMPUTER | EXECUTE (MUST BE TRUE TO RUN MULTIPLY) |
| GO | U47/9(FIG 2) | PULSE DUE TO BEGINNING OF ACTUAL BOARD ACCESS |
| ILGADD | U10/14(FIG 3) | ILLEGAL ADDRESS FLAG |
| LDM1* | U43/15(FIG 3) | LOAD M1 ENABLE (NT) |
| LDM2* | U43/7(FIG 3) | LOAD M2 ENABLE (NT) |
| LDM3* | U43/9(FIG 3) | LOAD M3 ENABLE (NT) |
| LDM4* | U43/10(FIG 3) | LOAD M4 ENABLE (NT) |
| LDP1* | U43/11(FIG 3) | LOAD P1 ENABLE (NT) |
| LDP2* | U43/12(FIG 3) | LOAD P2 ENABLE (NT) |
| LDP3* | U43/13(FIG 3) | LOAD P3 ENABLE (NT) |
| LDP4* | U43/14(FIG 3) | LOAD P4 ENABLE (NT) |
| LDS* | COMPUTER | LOWER BYTE DATA STROBE (NT) |
| LOAD* | U26/7(FIG 3) | LOAD PULSE (NT) (INITIALIZES ALL SERIAL CIRCUITRY PRIOR TO RUN) |
| MADDER | U24/10(FIG 5) | MULTIPLIER ADDRESS ERROR |
| MCLK | U37/8(FIG 3) | MULTIPLIER SERIAL CLOCK |
| MOVFER* | U39/8(FIG 5) | MULTIPLIER OVERFLOW ERROR |
| OEM3* | U44/9(FIG 3) | OUTPUT ENABLE M3 (NT) |
| OEM4* | U44/10(FIG 3) | OUTPUT ENABLE M4 (NT) |
| OEP1* | U44/11(FIG 3) | OUTPUT ENABLE P1 (NT) |
| OEP2* | U44/12(FIG 3) | OUTPUT ENABLE P2 (NT) |
| OEP3* | U44/13(FIG 3) | OUTPUT ENABLE P3 (NT) |
| OEP4* | U44/14(FIG 3) | OUTPUT ENABLE P4 (NT) |
| OESTAT* | U44/7(FIG 3) | OUTPUT ENABLE MULTIPLIER BOARD STATUS REGISTER |
| OVF | U27/9(FIG 1C) | OVERFLOW FLAG (SET WHEN SERIAL ACCUMULATION HAS CAUSED A 2'S COMPLIMENT OVERFLOW) |
| PCMA | U24/4(FIG 2) | ADDRESS REGISTER STROBE |
| RCLK | U35/8(FIG 3) | SERIAL REGISTER CLOCK |
| RCLK* | U24/13(FIG 3) | RCLK (NT) |
| RCLKP | U46/6(FIG 4) | REGISTER CLOCK PULSE (TRUE WHEN DATA VALID FOR REG WRITE) |
| RDLO | U20/6(FIG 1A) | READ LO WORD NEXT (SET AFTER HI WORD HAS BEEN READ BY D.P. ROUND, CLEARED AFTER NEXT BOARD READ) |
| RDLO* | U20/5(FIG 1A) | RDLO (NT) |
| REN* | U52/7(FIG 2) | REGISTER OUTPUT ENABLE (NT) |
| RESET* | COMPUTER | CPU RESET (NT) |
| RND | U4/19(FIG 3) | ROUND |
| RND* | U35/10(FIG 1C) | RND (NT) |
| RNDP | U15/2(FIG 1C) | ROUND PULSE (TRUE DURING BIT TIME OF DATA TO BE ROUNDED) |
| RRER | U40/6(FIG 1A) | ROUND READ ERROR FLAG (SET BY NOT READING LO WORD OF D.P. ROUNDED RESULT BEFORE WRITING TO BOARD) |

TABLE 3-continued

| SIGNAL | GENERATED BY | FUNCTION (NT = NEGATIVE TRUE) |
|---|---|---|
| RUN | U26/6(FIG 3) | SERIAL CIRCUITRY CLOCK GATE |
| RUN* | U26/5(FIG 3) | RUN (NT) |
| R/W* | COMPUTER | CPU READ/WRITE (WRITE NT) |
| SCLK | U37/3(FIG 3) | SYSTEM CLOCK |
| SE* | U49/11(FIG 6) | SIGN EXTEND (NT) |
| SET* | U47/6(FIG 2) | MULTIPLIER BOARD ACCESS PENDING (NT) |
| SPROD | U32/6(FIG 1A) | SINGLE PRECISION PRODUCT |
| SPRND* | U36/3(FIG 3) | SINGLE PRECISION ROUND PULSE (NT) |
| START | U20/9(FIG 3) | PULSE AT START OF MULTIPLY OR ROUND |
| STOP | U35/6(FIG 3) | CLOCK COUNTER STOPPED |
| STOP* | U22/7(FIG 3) | STOP (NT) |
| SUB | U4/15(FIG 3) | SUBTRACT |
| UDS* | COMPUTER | UPPER BYTE DATA STROBE (NT) |

I claim:

1. An addressable electronic processor, for performing high speed mathematical operations connected to a multibit external address bus and to an external data bus, comprising:
   address receiving means for receiving coded address signals from the address bus;
   data I/O means for receiving and providing data signals to and from the data bus, said data signals being in parallel with some of said address signals;
   decoding means, connected to said address receiving means, for generating a unique combination of control signals for each received address;
   data manipulation means, connected to said data I/O means and decoding means, for storing and manipulating the data signals under control of the control signals, said means comprising:
      multiplying means for receiving data signals when a first combination of control signals is actuated, and for generating a multiplied value of two data signals when a second combination of control signals is actuated;
      results storage means for storing a predetermined value;
      arithmetic circuit means for performing serial arithmetic operations on two operands and sending the resulting value to said results storage means, said operations including:
         selectively adding or subtracting the multiplied value and the predetermined value and storing the resulting value as the predetermined value, when activated by control signals responsive to an address indicative of the selected operation, and
         adding a rounding pulse to the predetermined value at a preselected bit as controlled by a particular combination of control signals responsive to the particular coded address signal received by the processor, wherein varying the bit to which the pulse is added or subtracted varies the scaling and rounding of the predetermined value.

2. An electronic processor as claimed in claim 1 further comprising means, connected to said arithmetic circuit means, for reading the sign bits of the resulting value and the two operands and generating an overflow signal indicative of an error in the sign of the expected result, and for gating said overflow signal to the data as an interrupt at the completion of an arithmetic operation if the sign bit does not correspond to the expected result.

3. An electronic processor as claimed in claim 1 wherein said decoding means comprises a first decoding circuit for determining when said electronic processor is addressed and for thereupon generating an addressed control signal.

4. An electronic processor as claimed in claim 3 further including a processor data bus; and
   wherein said data I/O means selectively couples the external data bus to said processor data bus for bidirectional data flow therebetween, and wherein said data I/O means includes enabling means for permitting or preventing data flow therethrough, said enabling means connected to receive and be actuated by said addressed control signal.

5. An electronic processor as claimed in claim 1 and further including a handshake signal generating circuit for generating a ready signal when said processor has completed manipulating said received data or has completed receiving any data sent thereto on said data bus.

6. An electronic processor as claimed in claim 1 wherein said multiplying means comprises a multiplier storage means and a multiplicand storage means.

7. An electronic processor as claimed in claim 6 wherein said decoding means comprises a second decoding circuit connected to said address receiving means for receiving at least some of said received address signals and for generating one of a plurality of data storage signals selected depending upon the decoded received address.

8. An electronic processor as claimed in claim 7 wherein said multiplicand storage means comprises at least two separately loaded first and second parts; wherein said multiplier storage means comprises at least two separately loaded first and second parts; and wherein said parts of said multiplier and multiplicand storage means are connected in parallel to said data I/O means and are individually connected to receive a corresponding one of said data storage signals and each includes means responsive to its data storage signal for effecting the storage of the data from said data bus.

9. An electronic processor as claimed in claim 8 wherein said first and second parts of said multiplier storage means are comprised of serial/parallel-in-serial out shift registers whose serial outputs and inputs are concatenated together; and which comprise means to select the serial input or parallel input modes;
   wherein said first and second parts of said multiplicand storage means comprise means for performing sequential multiplication of two numbers and are concatenated together to provide both an output from one and from both storage means, the input to said one storage means connected to the serial output of said multiplier storage means; and
   wherein said decoding means further comprises a third decoding circuit connected to said address receiving means for receiving at least some of said received address signals and for generating a selected output, and said decoding means comprises a timing control circuit for generating control signals, timing signals and clocking signals in response to said selected output of said third decoding circuit, one of said control signals being connected to said shift registers for selecting the serial input-output mode, and said clocking signals clocking said multiplier storage means, said multiplicand storage means and said results storage means such that on command of a timing signal, said number stored in said multiplier storage means is clocked into said multiplicand storage means where it is multiplied by the number stored therein, and said result is clocked into said results storage means.

10. An electronic processor as claimed in claim 9 wherein said third decoding circuit comprises addressable memory means having a plurality of numbers stored at locations individually addressable by said received address signals, counter means connected to receive the output of said memory means, for providing, when clocked, a predetermined number of pulses based on said memory means output, first control signal generating means for determining from said received address signals whether a multiplication operation is to be performed and thereupon for generating a first control signal, said first control signal being coupled to said counter means to cause the output from said memory means to be stored in said counter, and clocking signal generating circuits for generating a clocking signal for clocking said counter means.

11. An electronic processor as claimed in claim 10 wherein said third decoding circuit further comprises second control signal generating means connected to receive said first control signal for generating a second control signal in response to the generation of said first control signal;

wherein said clocking signal generating circuit is connected to receive said second control signal and generate a first clocking signal for clocking said counter means and generate a second clocking signal for clocking said multiplier storage means upon the generation of said second control signal until said counter means reaches a predetermined count; and wherein said second control signal is coupled to operate said mode select means of said multiplier storage means.

12. An electronic processor as claimed in claim 1 wherein said arithmetic circuit means is connected to receive an arithmetic signal obtained from said received coded address and to add or subtract said product results and said stored number in response to said arithmetic signal.

13. An electronic processor as claimed in claim 12 wherein said arithmetic signal is one of said coded address signals and said arithmetic circuit is directly coupled to receive said coded address signal.

14. An electronic processor as claimed in claim 1 wherein said results storage means is comprised of a first part and a second part, each said part being connected in parallel to said data I/O means and individually connected to receive a corresponding one of said data storage signals, and each said part includes means responsive to its data storage signal for effecting the storage of the data on said data bus, and wherein each said results storage means part is connected to the output of said arithmetic circuit means for selectively storing the sum or difference therein.

15. An electronic processor as claimed in claim 14 wherein said arithmetic circuit means and said results storage means are connected to receive a double precision signal obtained from said received coded address and said arithmetic circuit means selects as an input the output from said first or said second multiplicand storage means part and said first or said second results storage means part stores the output from said arithmetic circuit means in response to said double precision signal.

16. An electronic processor as claimed in claim 7 wherein said decoding means comprises a fourth decoding circuit connected to said address receiving means for receiving at least some of said received address signals and for generating data retrieval signal depending upon the decoded received address;

wherein said results storing means, said multiplicand storage means and said multiplier storage means are connected in parallel to said data I/O means, are individually connected to receive a corresponding one of said data storage signals and are responsive to its data storage signal for effecting the storage of the data on said data bus; and wherein said results storing means is connected to receive said data retrieval signal and is responsive thereto for supplying the data stored therein to said data I/O means.

17. An electronic processor as claimed in claim 16 wherein said fourth decoding circuit generates one of a plurality of data retrieval signal depending upon the decoded received address and said results storing means is comprised of a first part and a second part, each said part being connected in parallel to said data I/O means and being individually connected to receive a corresponding one of said data retrieval signals for supplying the data stored therein to said data I/O means.

* * * * *